(12) United States Patent
Soby et al.

(10) Patent No.: US 11,870,783 B2
(45) Date of Patent: Jan. 9, 2024

(54) CLASSIFICATION MANAGEMENT

(71) Applicant: AppOmni, Inc., San Francisco, CA (US)

(72) Inventors: Brian Soby, Carbondale, CO (US); Timothy Bach, Emeryville, CA (US)

(73) Assignee: AppOmni, Inc., San Francisco, CA (US)

( * ) Notice: Subject to any disclaimer, the term of this patent is extended or adjusted under 35 U.S.C. 154(b) by 362 days.

(21) Appl. No.: 17/308,863

(22) Filed: May 5, 2021

(65) Prior Publication Data

US 2022/0201002 A1 Jun. 23, 2022

Related U.S. Application Data

(63) Continuation of application No. 17/130,484, filed on Dec. 22, 2020, now Pat. No. 11,044,256.

(51) Int. Cl.
| | |
|---|---|
| *H04L 9/40* | (2022.01) |
| *G06N 5/04* | (2023.01) |
| *G06F 16/23* | (2019.01) |
| *G06F 16/28* | (2019.01) |

(52) U.S. Cl.
CPC ........ *H04L 63/104* (2013.01); *G06F 16/2379* (2019.01); *G06F 16/285* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 2017/0004084 A1 | 1/2017 | Kim | |
| 2017/0272349 A1* | 9/2017 | Hopkins | ............. G06F 9/44505 |
| 2020/0184090 A1* | 6/2020 | Grand | .................... G06F 21/62 |

* cited by examiner

*Primary Examiner* — Cai Y Chen
(74) *Attorney, Agent, or Firm* — Van Pelt, Yi & James LLP

(57) ABSTRACT

Classification management is disclosed, including: obtaining, via a user interface, mappings of stored elements to a plurality of classifications, wherein the mappings include prescribed security attributes corresponding to the plurality of classifications; obtaining, via the user interface, a policy that includes identifying information associated with a set of actors and a specified at least portion of the plurality of classifications; comparing a set of configured security attributes associated with the set of actors to at least a portion of the prescribed security attributes corresponding to the specified at least portion of the plurality of classifications; and outputting information pertaining to a set of discrepancies determined based at least in part on the comparison.

20 Claims, 22 Drawing Sheets

Classifications / Classification: New Classification A

New Classification A                                    Delete  Edit

CHANGE PARENT
Parent Classification C ⌄

DESCRIPTION
This classification has no description.

IMPACT  ⊕—1004

Data Mappings
In the tables below, click on a service to move it into the desired mapping assignment.

⊗ SaaS Platform B Data Mappings                    Add SaaS B Mapping + — 1002

| MAPPINGS | SERVICES |
|---|---|
| Current Default  Account-Read  This is the default mapping for Salesforce services.  Unset | The following services are assigned to this mapping through default inheritence.  (AppOmni Dev Org) |
| Set as Default  Test | |
| Set as Default  SomeChild | |

Classifications / Classification: New Classification A / Mapping: Account-Read

Account-Read

SERVICE TYPE: MAPPING FOR:
SaaS B  New Classification A          [Edit] [Delete]

Services
The following services are assigned to this mapping.
(AppOmni Dev Org)

Mapped Rules

Rules

[Objects] | Custom Settings/Metadata | Permissions | Components

PER PAGE
100 rows per page  < 1 >

☐ Only show expiring

[Actions...] [▼Filter] 1102
[Add Object +]

| KEY ‖ Standard Object ‖ Custom Object | | | | | | | | | |
|---|---|---|---|---|---|---|---|---|---|
| ☐ TARGET OBJECT | CREATE | READ | EDIT | DELETE | VIEW ALL | MODIFY ALL | NOTES | ACTIONS |
| ☐ account Account Add Field or Record Rule + | — | ✓ | — | — | — | — | 🔳 | ✏️ 1104 |

FIG. 11

Policies

| Security Policies | Functional Policies | Service Config Policies |

PER PAGE: 100 rows per page

< 1 >

1602 — Add Policy +  ▽Filter

KEY | | Whitelist | Blacklist

| POLICY NAME | TYPE | STATUS | ROLE GROUPS | ISSUES | ACTIONS |
|---|---|---|---|---|---|
| blahpolicy | Salesforce | Disabled ⊂⊃ Enabled | 0 | 0 | ⊙ 👤 |
| blahpolicy | Salesforce | Disabled ⊃⊂ Enabled | 1 | 0 | ⊙ 👤 |
| blahpolicy | Salesforce | Disabled ⊂⊃ Enabled | 0 | 0 | ⊙ 👤 |
| Brakes | Salesforce | Disabled ⊂⊃ Enabled | 1 | 0 | ⊙ 👤 |
| Classifications Blacklist Policy | Classification | Disabled ⊂⊃ Enabled | 5 | 0 | ⊙ 👤 |
| Classifications Policy | Classification | Disabled ⊂⊃ Enabled | 0 | 0 | ⊙ 👤 |
| cls2 | Classification | Disabled ⊂⊃ Enabled | 1 | 0 | ⊙ 👤 |
| Default Customer Support Portal | Salesforce | Disabled ⊂⊃ Enabled | 8 | (105) | ⊙ 👤 |
| External Users (dev/int) | Salesforce | Disabled ⊂⊃ Enabled | 1 | (150) | ⊙ 👤 |
| External Users Policy | | | | | |
| Financials | Classification | Disabled ⊂⊃ Enabled | | (1) | ⊙ 👤 |

CLASSIFICATION MANAGEMENT

CROSS REFERENCE TO OTHER APPLICATIONS

This application is a continuation of U.S. patent application Ser. No. 17/130,484 entitled CLASSIFICATION MANAGEMENT filed Dec. 22, 2020 which is incorporated herein by reference for all purposes.

BACKGROUND OF THE INVENTION

Existing labeling schemes for cloud software focus on simply schema-based application of simple labels that are lacking in expressiveness and the ability to reflect the structure of organizations. However, often, these existing labeling schemes do not closely map to the realities of business.

BRIEF DESCRIPTION OF THE DRAWINGS

Various embodiments of the invention are disclosed in the following detailed description and the accompanying drawings.

FIG. 10 is a diagram showing an example user interface for configuring a new classification, "New Classification A."

FIG. 11 is a diagram showing an example user interface for configuring a new mapping for "New Classification A."

FIG. 16 is a diagram showing an example user interface for presenting a set of configured policies.

FIG. 18 is a diagram showing an example user interface for presenting the results of an audit performed on the "Financials" policy.

DETAILED DESCRIPTION

Figure 1:
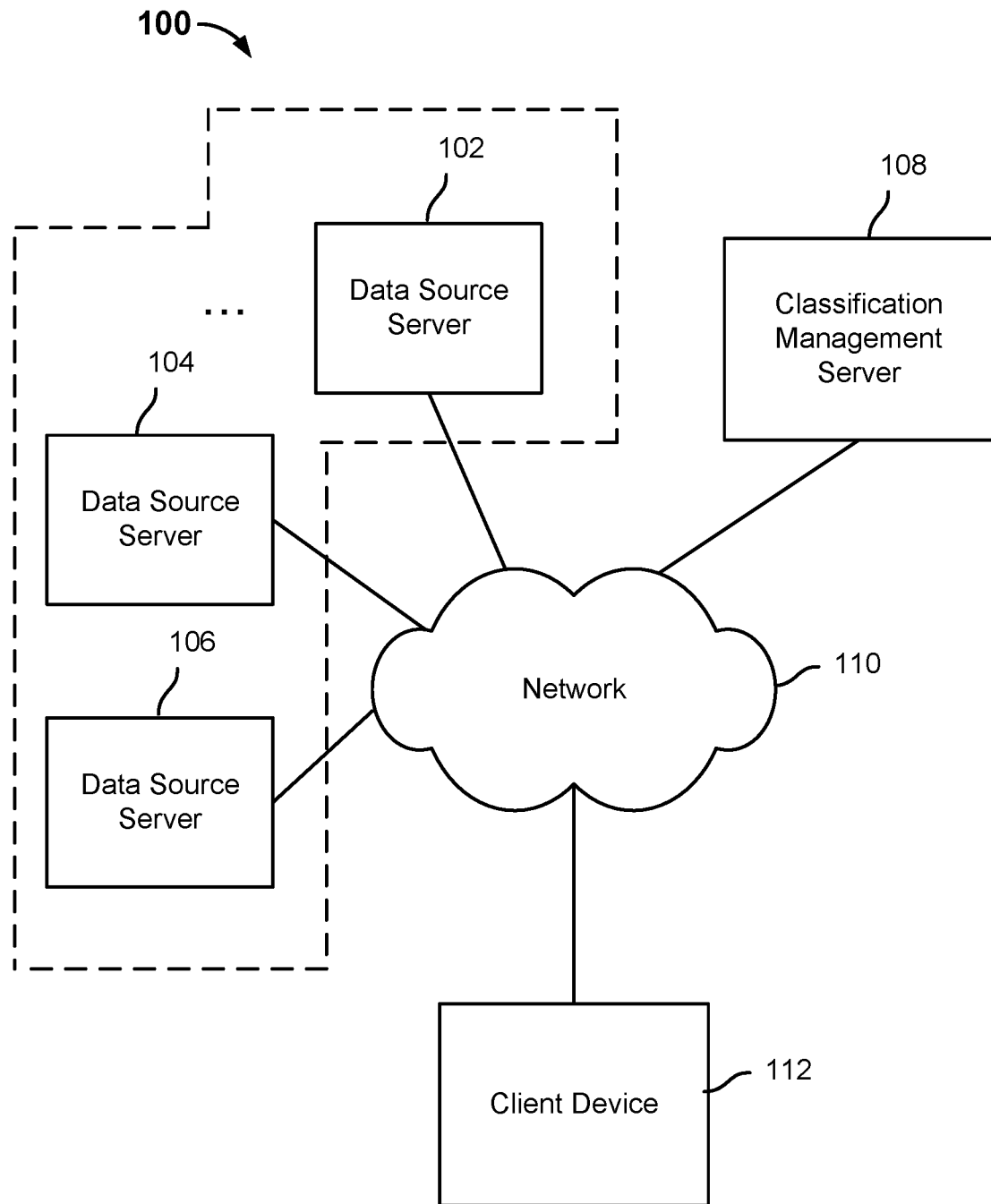
FIG. 1 is a diagram showing an embodiment of a system for element management using a customizable classification.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of element management using a customizable classification system are described herein. Mappings of elements to a plurality of classifications are obtained via a user interface that is provided by a classification management server. In various embodiments, an "element" comprises stored data, processed data, detected data, identified data, configuration, compliance or auditing-supporting elements, and user or administrative log events. In some embodiments, the plurality of classifications is associated with a plurality of hierarchical levels. For example, a set of classifications can represent the totality or portions of a business process, business structure, organizational structure, geographical structure, industry standard, functional or security recommendations, or data labeling scheme. In various embodiments, each classification is associated with a customizable name and one or more customizable tags. In various embodiments, using the user interface, a user selects at least a subset of elements that is stored at, processed by, or otherwise made available by or through each of one or more data sources (e.g., where each data source is a corresponding Software as a service (SaaS) server or service) to be associated and therefore, managed under a particular classification of the plurality of classifications. In various embodiments, a "data source" comprises actual/active configurations of a (e.g., SaaS) source, an extract of configuration or metadata from a (e.g., SaaS) source, a theoretical or proposed set of changes to a (e.g., SaaS) source, a set of changes in a development or test representation of a (e.g., SaaS) source, an offline copy/backup/replica of a (e.g., SaaS) source, a clone of a (e.g., SaaS) source, or other full or partial representation of a (e.g., SaaS) source. For example, a user can map elements from two or more different data sources (e.g., SaaS platform servers) to the same classification so that the elements across these two or more data sources can be managed together under the same classification. In another example, SaaS system configurations can be mapped corresponding to a classification indicating criticality, risk, impact, identified good or bad practice, or reference to industry standards such as Center for Internet Security (CIS) benchmark. In another example, elements, a specific access to elements, configurations, event monitoring processes, permissions, or administrative capabilities from one or more data sources can be mapped to a set of classifications that correspond to sections, subsections, or specific controls supporting a compliance or auditing process or standard, such that the set of classifications can be used to assemble a compliance or auditing system or process. Using the user interface, the user submits a prescribed security attribute for each selected element from a corresponding data source (e.g., SaaS platform server) that is mapped to a particular classification. In various embodiments, a "prescribed security attribute" is a security attribute that is submitted by the user to the classification management server (over the user interface) and that is to be associated with each element from a data source that has been selected to be mapped to a particular classification. Examples of a "prescribed security attribute" include a privileged type, permission type, an access type, setting value, business process, user or admin event type, application integration, "cloud code" software file, channel access, repository access, or other component of a SaaS service. Specific examples of a prescribed security attribute include one or more of the following: create, read, edit, delete, share, list, upload, download, connect, login attempt, data access attempt, data modification attempt, API call, integration linkage, monitoring process, business process, administrative permission usage, view all, and modify. A policy that includes identifying information associated with a set of actors and a specified at least portion of the plurality of classifications is obtained via the user interface by the classification management server. A set of configured security attributes associated with the set of actors that is specified by the policy is compared to at least a portion of the prescribed security attributes corresponding to the specified at least portion of the plurality of classifications that is specified by the policy. In various embodiments, an "actor" comprises a user, a system, a machine, an image, a process, an application, an account, or a combination of one or more of the above. In various embodiments, a "configured security attribute" is a security attribute that had actually been configured at a particular data source associated with element that is stored at, processed by, or made available through the data source. Information pertaining to any discrepancies that have been determined between the prescribed security attributes of the classification management server for the data source stored, processed, or made available elements that are mapped to the classification(s) specified by the policy and the actually configured security attributes corresponding to the same elements at their respective data source(s) with respect to the set of actors are determined and output. For example, the discrepancies may be output at the user interface of actors.

FIG. 1 is a diagram showing an embodiment of a system for element management using a customizable classification. System 100 includes data source server 102, data source server 104, data source server 106, classification management server 108, network 110, and client device 112. Network 110 may be implemented using data networks and/or telecommunication networks. Data source server 102, data source server 104, data source server 106, classification management server 108, and client device 112 may communicate to each other over network 110.

Each of data source servers 102, 104, and 106 is configured to store elements associated with a cloud-based service or a software as a service (hereinafter referred to as "SaaS") platform. In various embodiments, each of data source servers 102, 104, and 106 is associated with a different SaaS platform. Examples of services provided by SaaS platforms include file storing, file sharing, customer relationship management, payroll management, employee data management, human resource data management, and financial management. For example, organizations such as enterprises may subscribe to services provided by one or more SaaS platforms to help manage their businesses. By subscribing to a SaaS platform, an actor (e.g., an administrative user) on behalf of an enterprise stores elements (e.g., personal data, customer data, employment data) with the SaaS platform at the SaaS platform's corresponding data source server. Furthermore, the administrative user on behalf of his or her enterprise is to configure security attributes with respect to the enterprise's elements at a particular SaaS. As mentioned above, in various embodiments, an "element" comprises stored data, processed data, detected data, identified data, configuration, compliance or auditing-supporting elements, and user or administrative log events. Configured security attributes may specify, for example, the types of accesses and permissions that are available to certain types of actors with respect to each subset of the elements. For example, sensitive elements (e.g., nonpublic data) should be configured such that only a limited number of actors (e.g., executives) within the enterprise can access such elements and public data should be configured such that most actors including both employees and even contractors of the enterprise can access (e.g., view) such elements.

Classification management server 108 is configured to provide to an actor management of elements using a set of customizable classifications. In various embodiments, classification management server 108 is configured to enable an actor (e.g., an administrative user at an enterprise) to flexibly align a classification structure, which may hierarchical in nature, to elements stored, processed, or otherwise made available at the data source server (e.g., data source server 102, 104, and/or 106) of each of one or more SaaS platforms to which the actor subscribes a corresponding service. While users of classification management server 108 may be actors other than enterprises, for purposes of illustration, enterprises or agents acting on their behalf are the users of classification management server 108 in examples described herein. Before classification management server 108 can enable an actor (e.g., an administrative user at an enterprise) to flexibly align a classification structure to elements stored, processed or otherwise made available through at one or more data source servers, the actor is to first submit the actor's credentials to the actor's account(s) at SaaS platforms associated with those data source server(s). For example, an administrative user at an enterprise can submit the credentials to the enterprise's accounts at the SaaS platforms to classification management server 108 via a user interface provided by classification management server 108 (e.g., a website that is accessible by a web browser executing at) using client device 112. Based on the received credentials, classification management server 108 is configured to connect to the enterprise's elements stored, processed, or otherwise made available at the data source servers of those SaaS platforms to which the enterprise subscribes to corresponding services.

To enable the enterprise to flexibly align the elements stored at the data source servers to a single, centralized classification structure, classification management server 108 is configured to then provide a user interface to an administrative user of the enterprise for configuring mappings between the enterprise's elements stored, processed, or otherwise made available at the SaaS platforms' data source servers and the classifications maintained by classification management server 108. For example, the administrative user of the enterprise can access the user interface (e.g., a website that is accessible by a web browser executing at) using client device 112. In some embodiments, the user interface can provide a customizable hierarchy (e.g., tree) of classifications. For example, the set of classifications may include some default and/or predetermined classifications based upon schema, company or vendor recommendations, best practices, industry standards, event monitoring detection suites, or compliance or auditing standards. The user can customize the set of classifications by adding a new classification, changing the level in a hierarchy of a particular classification, deleting a classification from the set, renaming a classification, and/or adding/changing metadata (e.g., changing risk/impact/trust/threat/environment/compliance or other attribute tags) of a classification. The user can then select, at the user interface, a classification in the set and then submit mappings between the enterprise's elements stored, processed, or otherwise made available each of one or more data source servers (associated with different SaaS platforms) and that classification. For example, elements (e.g., stored, proposed, theoretical, extracted, partial, or simulated by an enterprise) at a data source server that are mapped to classification(s) can be very granular, such as sets of data records that match a given set of criteria (e.g., "all records with these attributes or characteristics are considered ProjectX"). For each mapping of the enterprise's SaaS platform elements, the administrative user can configure, at the user interface, one or more prescribed security attributes. In various embodiments, "prescribed security attributes" describe the enterprise's intended/desired security attributes for the enterprise's SaaS platform element(s) related to the mapping. For example, the prescribed security attributes define one or more of: create, read, edit, delete, share, list, upload, download, connect, login attempt, data access attempt, data modification attempt, API call, integration linkage, monitoring process, business process, administrative permission usage, view all, and modify all types of accesses/permissions. Classification management server 108 is configured to store for each classification in the set, the administrative user submitted mappings between that classification and elements stored at each of one or more data source servers associated with respective one or more SaaS platforms. Because the classifications of the hierarchy may include mappings to an enterprise's elements stored at potentially multiple SaaS platforms, the hierarchy of classifications that is managed by classification management server 108 provides a unified technique of managing disparate SaaS data under one (e.g., hierarchical) classification scheme. Furthermore, because the element mappings can be updated over time, the elements across different SaaS platforms can also be flexibly managed under the classification scheme.

One or more sets of classifications can manage the ability to incorporate arbitrary areas of a SaaS service or even a business process. For example, elements comprising as "Sarbanes Oxley→Subsection 5a" at a SaaS service, which really represents a business process such as "review all audit events representing changes to IP restrictions that may have occurred" can be selected and mapped to one or more classifications to assemble near-arbitrary configuration, data accesses, record segmentation, integration/application access, etc., to assemble a larger security management program such as the various controls and processes used by an enterprise to comply with "Sarbanes Oxley." This allows for proper business modeling using classifications. Furthermore, a hierarchical set of classifications can be used to model business processes that are themselves hierarchical in nature, such as regulatory standards that include many subsections and descendant requirements.

Classification management server 108 is further configured to provide a user interface to enable an administrative user to define a policy with respect to at least one selected classification of the set of classifications and a selected set of actors. In some embodiments, the set of actors may be selected in the policy as specified one or more individual actors or as any actor that meets one or more specified attributes (e.g., a specified attribute is an employment status or domain name of a registered email address) associated with a "role group." In some embodiments, a policy is also defined with a policy type. For example, a policy type may be a whitelist policy (e.g., for which the selected classifications' prescribed security attributes define the Allowed Accesses for the specified set of actors), a blacklist policy (e.g., for which the selected classifications' prescribed security attributes define the Forbidden Accesses for the specified set of actors), or a functional policy (e.g., for which the selected classifications' prescribed security attributes define the Required or Mandatory Accesses for the specified set of actors). As will be described below, a policy provides a reference by which classification management server 108 can monitor the current actual, proposed, theoretical, extracted, partial, or simulated configurations of security attributes with respect to the policy's set of actors within the enterprise's SaaS elements in the policy's selected classification(s) and the enterprise's prescribed security attributes for the same elements. Periodically or in response to an actor's instruction to perform an audit (which is sometimes also referred to as a "scan") for a policy, classification management server 108 is configured to obtain from one or more data source servers, the actual, proposed, theoretical, extracted, partial, or simulated configured security attributes corresponding to the SaaS platform elements related to the mapping(s) of the classification(s) specified in the policy for the set of actors specified in the policy and compare those actors' actual configured security attributes to the prescribed security attributes associated with those classification(s) in light of the policy type (e.g., whitelist or blacklist) of the policy. Any discrepancies between those actual configured security attributes and the prescribed security attributes based on the policy type are output by classification management server 108. Such discrepancies generally highlight an undesirable mismatch between the enterprise's desired/intended security attributes for the set of actors specified in the policy and the enterprise's current actually, proposed, or simulated configured security attributes for the set of actors specified in the policy. These discrepancies shine a light on possible security or functional risks that warrant the enterprise's attention or functional deficiencies that may cause denial of service, test failure, or inability for the actor(s) to perform their require business processes or operations. In some embodiments, classification management server 108 is configured to recommend one or more actions for the enterprise to take to resolve each such discrepancy or to directly perform those actions or effect those changes to the SaaS services, environments, change sets, proposed changes, code, or files ("target") which would resolve the functional or security deficiencies by altering the state of those target set of actors.

Given the vast amount of elements that are stored, proposed, theoretical, extracted, partial, or simulated by an enterprise at a data source server of a particular SaaS platform and the various types of users that may access different portions of the elements, it may be difficult for an administrative user of the enterprise to manually verify whether his or her configured security attributes for data at the SaaS platform meet the enterprise's desired/intended security goals. Furthermore, each SaaS platform's existing labeling scheme may not be expressive or flexible enough to assist an administrative user of an enterprise to perform the needed governance on the elements stored at the SaaS platform's data source server. Moreover, because an enterprise may simultaneously subscribe to multiple SaaS platforms' services, the complexity in an enterprise's management of security attributes and general governance of its elements across the various SaaS platforms with their respective existing labeling scheme only multiplies. However, various embodiments described herein facilitate the alignment of an enterprise's SaaS elements across different and multiple platforms to be aligned to a single (e.g., hierarchical) classification scheme, which allows both flexibility in the scheme's mappings to the SaaS elements but also provides a centralized reference for the enterprise's desired ("prescribed") security attributes, which describe the natures of access, across elements mapped to each classification.

Figure 2:
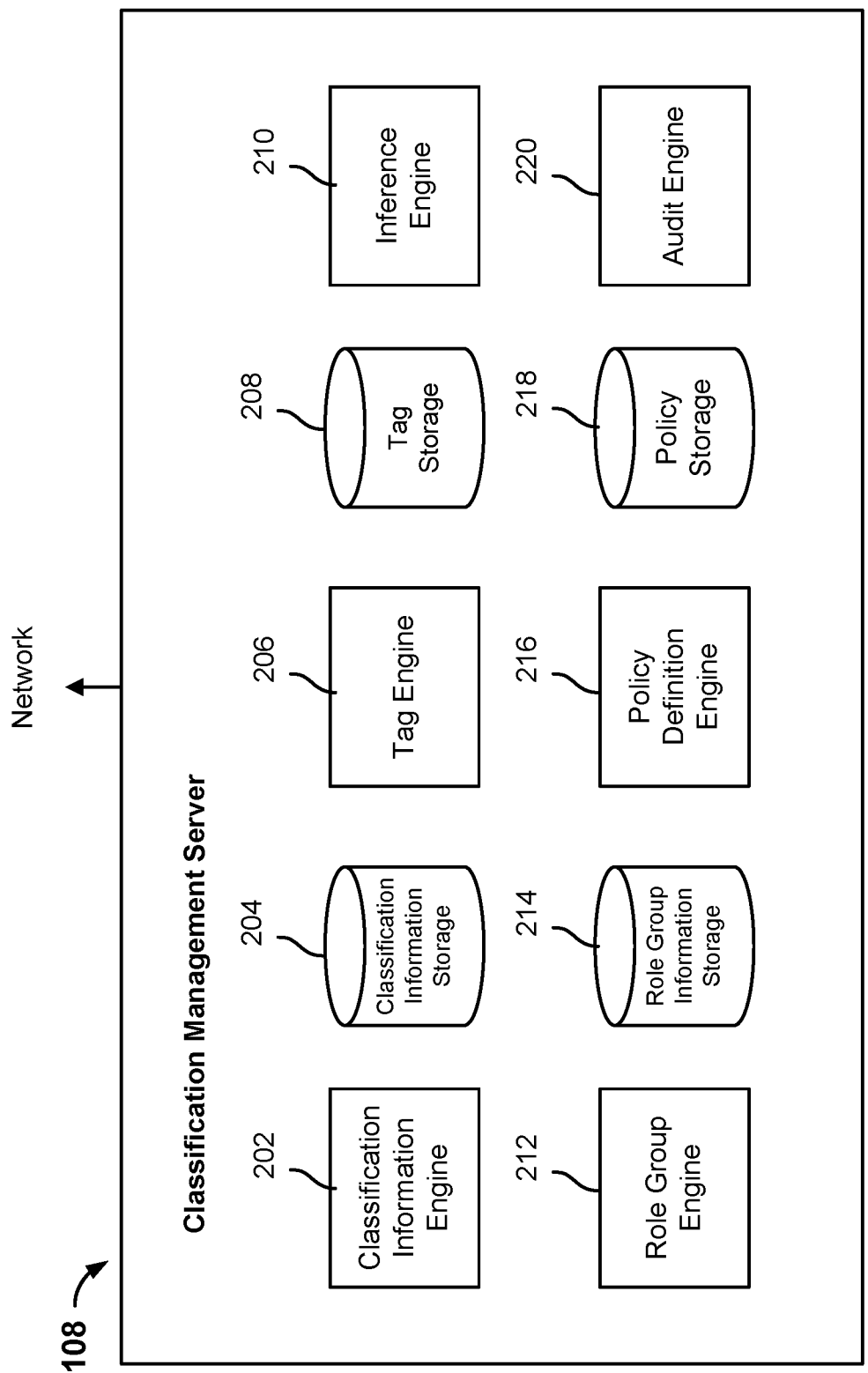
FIG. 2 is a diagram showing an example of a classification management server.

FIG. 2 is a diagram showing an example of a classification management server. In some embodiments, classification management server 108 of system 100 of FIG. 1 may be implemented using the example described in FIG. 2. In the example of FIG. 2, the classification management server includes classification information engine 202, classification information storage 204, tag engine 206, tag storage 208, inference engine 210, role group engine 212, role group information storage 214, policy definition engine 216, policy storage 218, and audit engine 220. In some embodiments, each of classification information engine 202, tag engine 206, inference engine 210, role group engine 212, policy definition engine 216, and audit engine 220 can be implemented, for example, as distinct or integrated software components, which can include module(s), package(s), and/or other distinct or integrated sub-components to provide an executable computer program that can perform these described functions when executed on a processor, and can be implemented using a programming language such as Scala, Go, Java, Python, Objective C, and/or other programming languages. An example hardware computing environment to execute the components of FIG. 2 includes a cloud computing service, such as Amazon's Web Services®. In some embodiments, each of classification information storage 204, tag storage 208, role group information storage 214, and policy storage 218 can be implemented using one or more databases by one or more types of storage media.

Classification information engine 202 is configured to receive a classification management server user's customizations to a hierarchy of classifications. In some embodiments, classification information engine 202 is configured to provide to an actor, at a user interface, a default set of classifications. For example, the actor may be an administrative user that is operating on behalf of an enterprise, which subscribes to service(s) that are provided by one or more SaaS platforms. In some embodiments, a "default set of classifications" comprises a set of predetermined classifications with (or without) predetermined hierarchical levels. For example, the default set of classifications includes one or more classifications with default names at each of one or more hierarchical levels. The user may interact with the user interface to customize the default set of classifications. In some embodiments, customization of the default set of classifications includes: adding a new classification, changing the level in the hierarchy of a particular classification, deleting a classification from the hierarchy, renaming a classification, and/or adding metadata/supplemental attributes (e.g., changing risk/impact/trust/environment/compliance/or other attribute tags) to a classification. For example, the user can add a new classification and specify whether the new classification is a child (e.g., in a hierarchical level directly below the level) of an existing parent classification or whether the classification has no parent classification within the hierarchy of classifications. In a first example, the user can change the hierarchical level of a classification within the hierarchy of classifications by updating the parent-child relationship between that classification and another classification within the hierarchy. In a second example, the user can delete a classification by removing it from the set of classifications altogether. In a third example, the user can rename a classification by giving it a new name. In a fourth example, the user can also add metadata to each classification such as one or more supplemental attributes (e.g., in the form of tags). In some embodiments, the one or more default tags and/or user defined tags that are stored at tag storage 208 can be presented at the user interface for the user to select and associate with one or more classifications within the set. In some embodiments, the user can define custom tags using a user interface that is provided by tag engine 206 and the defined tags can be stored at tag storage 208. For example, different tags may represent a different attribute with respect to a classification and its corresponding mapped to data at one or more data sources (e.g., SaaS platforms). For example, a tag may describe a particular level of confidentiality, integrity, or compliance/regulatory consideration with which the user assigns to a classification and its mapped to elements. The customized hierarchy of classifications may be stored for each user (e.g., associated with an enterprise) at classification information storage 204. The customized hierarchy of classifications corresponding to each user may be updated over time by the user (e.g., to accommodate the user's varying needs in managing the enterprise's elements).

Classification information engine 202 is further configured to receive user submitted mappings between (e.g., SaaS platform) elements and each of one or more classifications within the set of classifications. In some embodiments, classification information engine 202 is configured to provide to the user a user interface for submitting mappings with respect to each classification of the user's customized set of classifications. The user may select a particular classification within the user's customized set of classifications and then submit mappings pertaining to that classification. After a particular classification is selected, in some embodiments, the user interface allows the user to select a particular SaaS platform for which the user would like to submit one or more mappings for this classification. After a particular SaaS platform has been selected, classification information engine 202 is configured to connect to a data source server corresponding to the selected SaaS platform to access the user's elements stored at that SaaS platform (e.g., using credentials or an integration connection that had been previously presented by the user). The user interface provided by classification information engine 202 allows the user to view at least some of the user's elements that is stored at the selected SaaS platform. The user interface provided by classification information engine 202 may also allow the user to view the elements as a real or virtual actor, a group of user actors, or an arbitrary combination of actors matching a set of criteria. That is, the user interface may allow viewing of elements as the totality or intersection of access by all elements with common attributes such as being external to the user's organization/enterprise, sharing particular attributes in common (e.g., email address ending in "@gmail.com"), or by other arbitrary grouping defined the commonality or intersection of direct or indirect attributes. An example of these elements are the specific records available to a grouping. From the user's presented SaaS elements, the user can select within the user interface provided by classification information engine 202 one or more elements from the user's SaaS elements to include in a mapping to the selected classification. Then, for that mapping that includes selected element(s) from a particular SaaS platform to the selected classification, the user can configure a set of prescribed attributes. In some embodiments, the set of prescribed attributes describes a set of (e.g., intended/desired) access types (e.g., create, read, edit, delete, share, list, upload, download, connect, login attempt, data access attempt, data modification attempt, API call, integration linkage, monitoring process, business process, administrative permission usage, view all, or modify all) with respect to the SaaS element(s) of the mapping with respect to the selected classification. In other embodiments, the set of prescribed attributes describes a set of allowable of disallowable configurations of the element. In other embodiments still, the set of prescribed attributes represents the performance, compliance, or not compliance with a business process such as monitoring, approval, or other evaluation around a set of actions, events, or settings that may be generated or emitted by a (e.g., SaaS) source. The user can use the user interface provided by classification information engine 202 to repeat the steps described above to configure mappings from the SaaS elements that are stored across multiple SaaS platforms to each of one or more classifications within the customized set of classifications. In some embodiments, the mappings to elements stored at each of one or more SaaS platforms that are associated with the customized set of classifications associated with a particular actor are stored at classification information storage 204.

Inference engine 210 is configured to scan a classification management server user's elements that is stored, processed by, or made available through a data source server (e.g., corresponding to a SaaS platform) and provide recommended or suggested classifications within the user's customized set of classifications based on the element's metadata. Specifically, inference engine 210 is configured to infer appropriate classifications within the user's customized set of classifications to which the user's SaaS elements belong by reading only the elements' metadata and not the actual underlying data/configuration, or content of the elements. For example, inference engine 210 can connect to an actor's elements that is stored at a data source server corresponding to a SaaS platform using the actor's provided credentials corresponding to the actor's account or access with the SaaS platform. Inferring appropriate classifications for the actor's SaaS elements by only reading the metadata of the elements is both faster than reading the underlying content of the elements and also protects the privacy/sensitivity of the actor's elements. For example, in the case of data elements, inference engine 210 can infer the nature and classifications of the element by analysis of the element's metadata such as schema location, file name, owner attributes, or other elements not involving downloading or otherwise inspecting the content of the data element. In some embodiments, the classifications that are recommended by inference engine 210 to be associated with different elements at a particular SaaS platform may be presented at the user interface that is provided by classification information engine 202 to the actor to enable the actor to submit mappings between his or her classifications and the actor's SaaS elements.

Role group engine 212 is configured to obtain a classification management server user's (e.g., an administrative user of an enterprise) definitions of role groups, where each role group describes a set of actors with respect to the enterprise's elements that are stored at a data source server (e.g., corresponding to a SaaS platform). In some embodiments, role group engine 212 is configured to provide a user interface to enable the user (e.g., an administrative user of an enterprise) to define a role group by inputting one or more attributes that describe actors that belong to that role group. For example, attributes that describe actors that belong to a role group include an employment status (e.g., a member of the public that is not associated with the enterprise, a contractor of the enterprise, a full-time employee of the enterprise, and an executive employee of the enterprise), a specific name, and/or an email address domain name, process name, application name or hash, machine name, group name, role name, common traits such as email domain or IP netblock, directory group, user or grouping attributes, geography, system or application type, company identity or relationship, or other logical or abstract grouping. In some embodiments, a role group is defined for a particular SaaS platform. In some embodiments, a role group definition is intended to describe at least a slice/segment of actors with respect to an enterprise's elements that is stored, processed, or made available through a particular SaaS platform. In some embodiments, the user (e.g., an administrative user of an enterprise) is also enabled by the user interface to associate a defined role group with metadata such as one or more tags. For example, the tags may describe the degree to which the set of actors associated with the role group are trustworthy and/or the degree to which the actors associated with the role group can have access to confidential information. The defined role groups are stored at role group information storage 214.

Policy definition engine 216 is configured to obtain a classification management server user's (e.g., an administrative user of an enterprise) definitions of policies. In some embodiments, policy definition engine 216 is configured to provide a user interface to enable the user (e.g., an administrative user of an enterprise) to define a policy by selecting a policy type (e.g., a blacklist policy, a whitelist policy, or a functional policy), selecting at least one classification within the user's customized set of classifications (e.g., that is stored at classification information storage 204), and selecting a role group (e.g., that is stored at role group information storage 214). Put another way, a defined policy specifies at least, for example: a policy type, one or more classifications within a customized hierarchy of classifications, and a role group. The defined policies are stored at policy storage 218. In various embodiments, a policy is used to monitor whether the set of actors matching a specified role group with respect to the classification management server user's (e.g., an administrative user of an enterprise) SaaS platform elements within the mappings to the specified classification(s) has security attributes (e.g., access types, permission types, privilege types, etc.) that are configured at the SaaS platform, extracted from the platform, proposed to the platform, or simulated of the platform, that are consistent with the prescribed security attributes that are included in the mappings to the specified classification(s) given the specified policy type.

Audit engine 220 is configured to perform an audit for each of one or more policies. In some embodiments, audit engine 220 is configured to perform an audit for each of one or more policies stored at policy storage 218. In some embodiments, audit engine 220 is configured to perform an audit for a policy in response to a user instruction or periodically (e.g., based on a period configured for that policy or receipt of a callout, API call, integration, or other process). In some embodiments, to perform an audit on a policy that specifies a policy type, a specified one or more classifications, and a specified role group associated with a specified SaaS platform, audit engine 220 is configured to first obtain mappings to elements stored at the specified SaaS platform with respect to the selected one or more classifications (e.g., such mappings are stored at classification information storage 204). Then, using these mappings, audit engine 220 is configured to query the data source server corresponding to the SaaS platform to obtain the configured security attributes corresponding to the enterprise's elements stored at, processed by, or made available through the SaaS platform that pertain to the mappings with respect to the set of actors that are described by the specified role group. Audit engine 220 is further configured to obtain the prescribed security attributes that are included in these mappings. Finally, audit engine 220 is configured to use the specified policy type to compare the obtained configured security attributes with respect to the set of actors that are described by the specified role group against the prescribed security attributes that are included in these mappings. Any discrepancies between the configured security attributes and the prescribed security attributes are identified and output by audit engine 220 at a user interface or through a configuration integration, callout, email, or workflow. In some embodiments, for each discrepancy, audit engine 220 is configured to present an associated risk score. For example, the risk score may be computed as a function of the tags associated with the classification(s) that are associated with the discrepancy and the number, nature, quality, or attribute of the actors for which the discrepancy had been detected. In some embodiments, for each determined discrepancy, audit engine 220 is configured to present information on how to remedy/fix the discrepancy (e.g., because a discrepancy can represent a security risk in that an actor is given access to elements that is stored, processed by, or made available through a SaaS platform that the actor should not have access to). In some embodiments, audit engine 220 directly or indirectly (e.g., through an integration to another system) triggers or causes to be triggered changes to the SaaS platform to remediate, change, or otherwise resolve the element, actor(s), or roles groups involved in a discrepancy. In some embodiments, for each determined discrepancy, audit engine 220 is configured to present an interactive widget (e.g., button) for fixing the discrepancy and in response to a user selection of the interactive widget, audit engine 220 is configured to send a request to the SaaS platform to change a configured security attribute at the SaaS platform in a manner that would eliminate the discrepancy.

For example, a policy that is defined by a classification management server user from Enterprise A on which audit engine 220 is to perform an audit is a whitelist type of policy that specifies the "Financials" classification of a customized set of classifications, and specifies a role group that describes executives at Enterprise A with respect to Enterprise A's elements stored at a SaaS Platform B. Because a whitelist type of policy monitors for configured security attributes that should match the prescribed security attributes, audit engine 220 is configured to determine whether the executives at Enterprise A have security attributes that are configured at SaaS Platform B that match the prescribed security attributes that are associated with the mappings to Enterprise A's elements at SaaS Platform B within the mappings that have been stored for the "Financials" classification. If there are any discrepancies between the actually configured security attributes associated with the group of executives at Enterprise A and the prescribed security attributes that should have been configured for the group of executives at Enterprise A, then audit engine 220 is configured to present information that describes such discrepancies at a user interface or, alternatively, to directly or indirectly perform actions that would cause such discrepancies to be resolved or remediated. For example, performing actions include generating (in an internal classification-aware language) representations of the actions that must be taken to resolve the discrepancy and then translating the representations in the internal language into application programming interface (API) calls/actions that are recognizable to the SaaS platform servers to actively remediate the discrepancy.

Figure 3:
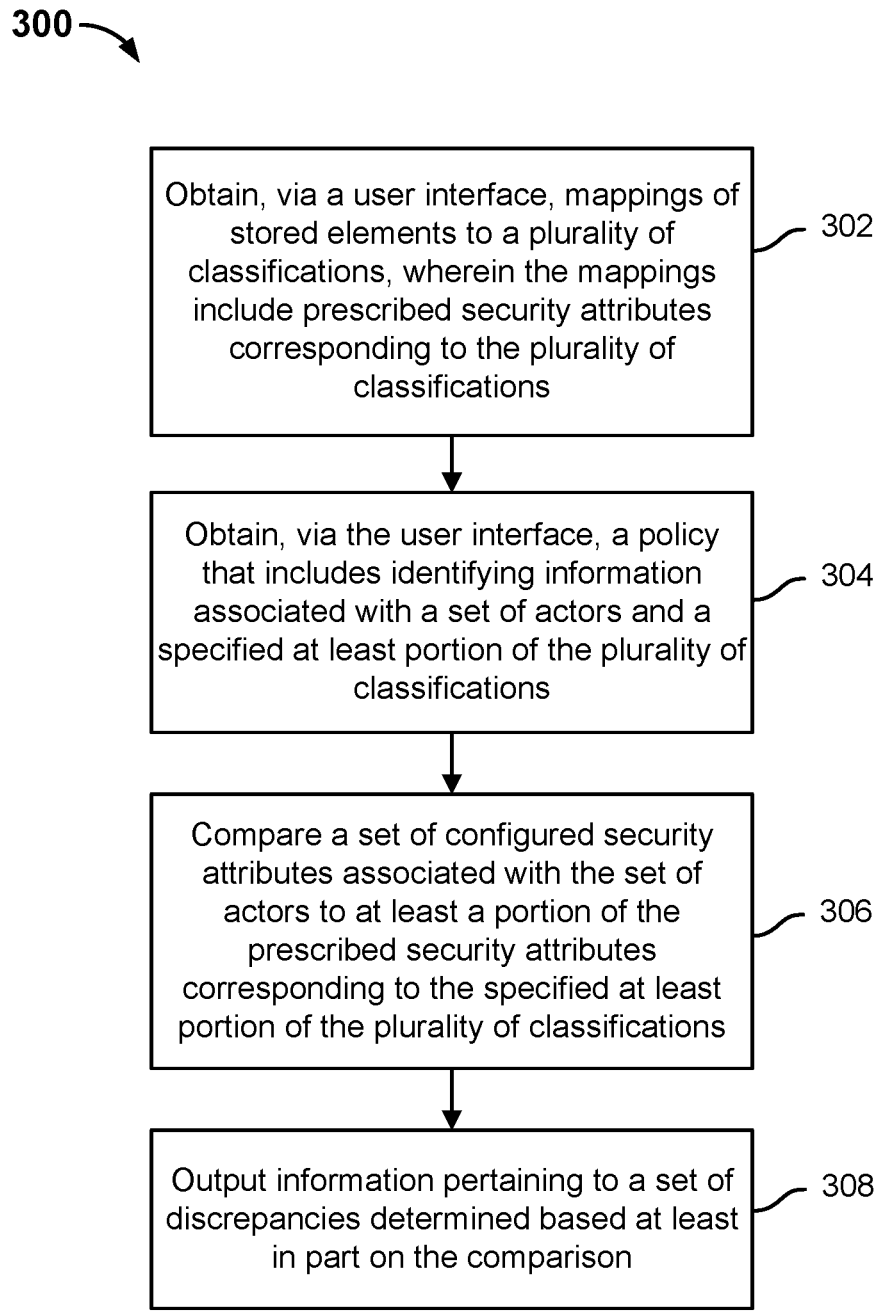
FIG. 3 is a flow diagram showing an embodiment of a process for using classification management.

FIG. 3 is a flow diagram showing an embodiment of a process for using classification management. In some embodiments, process 300 is implemented by classification management server 108 of system 100 of FIG. 1.

At 302, mappings of stored elements to a plurality of classifications are obtained via a user interface, wherein the mappings include prescribed security attributes corresponding to the plurality of classifications. In some embodiments, the "elements" to which the mappings from one or more classifications of a (e.g., customized) set of classifications map comprise elements at one or more SaaS platforms. In some embodiments, the set of classifications comprises a hierarchy of classifications. Each mapping includes a specified classification within a set of classifications, specified element(s) from a SaaS platform, and prescribed (e.g., intended/desired) security attributes for those element(s).

At 304, a policy that includes identifying information associated with a set of actors and a specified at least portion of the plurality of classifications is obtained via the user interface. In some embodiments, the "set of actors" that is included in a policy is described by a role group that is associated with the policy.

At 306, a set of configured security attributes associated with the set of actors is compared to at least a portion of the prescribed security attributes corresponding to the specified at least portion of the plurality of classifications. In some embodiments, configured security attributes associated with the set of actors are the security attributes that have been actually configured for the set of actors at a data source (e.g., corresponding to the SaaS platform) within the mapping(s) that are included in the specified classification(s) of the policy.

At 308, information pertaining to a set of discrepancies determined based at least in part on the comparison is outputted. The information pertaining to a set of discrepancies may be presented at a user interface and in some embodiments, with instructions on how to eliminate the discrepancies (e.g., how to manually change the configured security attributes at the SaaS platform to align them with the prescribed security attributes). In some embodiments, the information pertaining to a set of discrepancies may also be converted into instruction code(s) allowing an engine authorized by the actor via the credentials provided to automatically remediate the discrepancies. The discrepancies are programmatically translated into the instruction codes in the correct order to successfully resolve the discrepancies.

Figure 4:
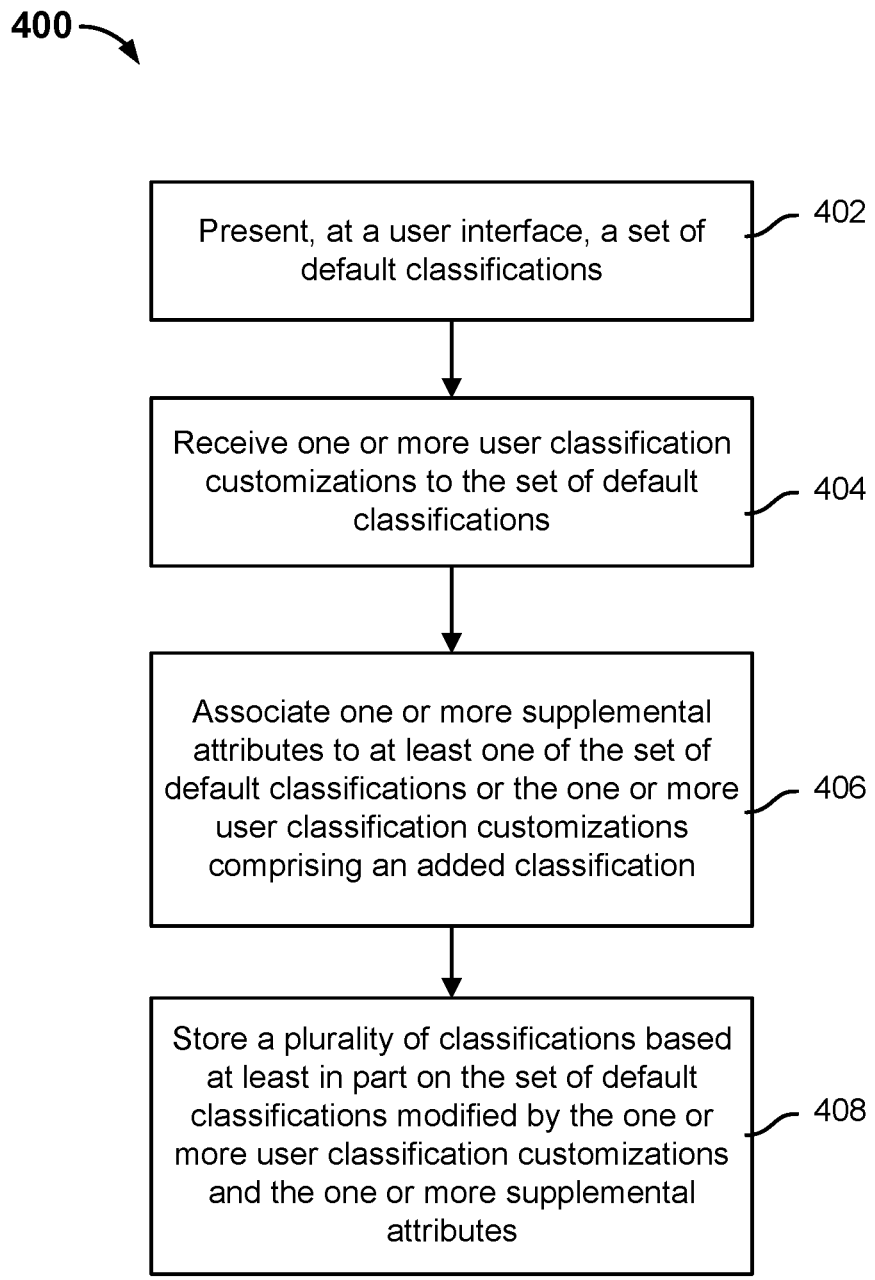
FIG. 4 is a flow diagram showing an example of a process for customizing a set of classifications.

FIG. 4 is a flow diagram showing an example of a process for customizing a set of classifications. In some embodiments, process 400 is implemented by classification management server 108 of system 100 of FIG. 1.

At 402, a set of default classifications is presented at a user interface. Each of the default classifications may include a default name that can be edited at the user interface. The default classifications may have default parent-child relationships that are editable at the user interface as well.

At 404, one or more user classification customizations to the set of default classifications are received. Example customizations that the user can submit include the addition of a new classification, the deletion of a classification, the updating of a name of a classification, and the changing of the hierarchical level of a classification within the hierarchy or to a newly created hierarchy/set of classifications.

406, one or more supplemental attributes are associated with at least one of the set of default classifications or one or more user classification customizations comprising an added classification. In some embodiments, each classification (e.g., a default classification or a user added classification) can be associated with a supplemental attribute. For example, a supplemental attribute is selected from a set of predetermined supplemental attributes or is a user defined supplemental attribute. For example, the supplemental attribute may describe an attribute of a classification. A specific example of a supplemental attribute is the degree to which the elements that are mapped to the classification are confidential in nature. Other specific examples of a "supplemental attribute" may include a category, an assignment of risk, an assignment of importance, an assignment of criticality, and an assignment of integrity. In some embodiments, the supplemental attribute may be represented by a corresponding tag.

At 408, a plurality of classifications is stored based at least in part on the set of default classifications modified by the one or more user classification customizations and the one or more supplemental attributes. The customized set of classifications comprises the default classifications, if any, as well as the user added new classifications as well as the default and/or user configured hierarchical levels of the classifications.

Figure 5:
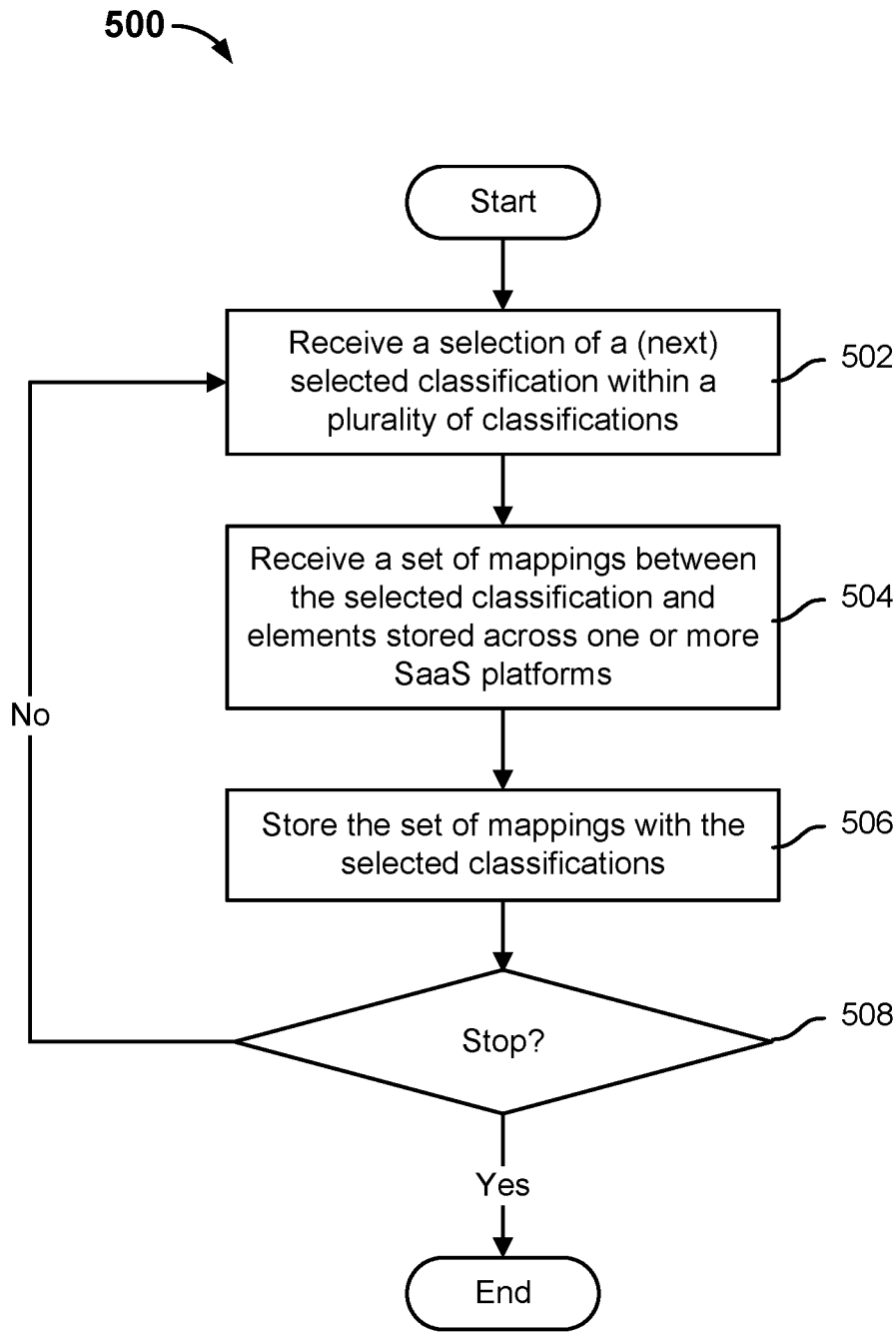
FIG. 5 is a flow diagram showing an example of a process for storing mappings for classifications.

FIG. 5 is a flow diagram showing an example of a process for storing mappings for classifications. In some embodiments, process 500 is implemented by classification management server 108 of system 100 of FIG. 1.

At 502, a selection of a (next) selected classification within a plurality of classifications is received. In some embodiments, mappings are to be configured for classifications in a hierarchy that is customized using a process such as process 400 of FIG. 4.

At 504, a set of mappings between the selected classification and elements stored across one or more SaaS platforms is received. In some embodiments, for a particular SaaS platform that is selected by a user (e.g., an administrative user of an enterprise) of the classification management server, the classification management server is configured to use that user's identity, access, or credentials with that SaaS platform to access that user's account with that SaaS platform. Then, the classification management server is configured to present a browser window that presents the user's elements (e.g., in the form of audit events, configurations, directories, files, resources, and/or other elements) from the SaaS platform at the user interface. The user can then select one or more elements from that user's account at the SaaS platform to include in one or more mappings to the selected classification. In some embodiments, for each mapping, the classification management server user submits a set of prescribed security attributes for the selected SaaS data.

At 506, the set of mappings is stored with the selected classification.

At 508, it is determined whether there are at least one more selected classifications for which mappings are to be configured. In the event that there is at least one more selected classification for which mappings are to be configured, control is returned to step 502. Otherwise, in the event that there are no more selected classifications for which mappings are to be configured, process 500 ends.

Conventional flat classification systems with basic resource mapping support such as the simple addition of "confidential" to a data, schema, or configuration do not allow for the governance required by organizations. These systems cannot align to the complex data asset inventory used by organizations to reflect their data assets and do not allow for a natural data management process. For example, privacy governance programs have a multitude of standards, frameworks, and regulatory processes to which data must be mapped in order to effectively report on their compliance with these standards. These standards define major compliance areas each with subcategories and concerns. Additionally, conventional systems to not take into consideration that nature of the access with respect to a piece of data. An example is the difference in business impact between the ability to read information such as protected forward financial and the ability to alter such data. As the former may be subject to confidentiality requirement, the latter would have an outsized impact on the integrity of regulatory business processes such as financial projections covered under regulatory standards such as the Sarbanes Oxley Act.

To effectively align a classification structure, it can be hierarchical in nature with each level independently supporting a mapping to the appropriate accesses, data elements, applications, and other resources associated with a given classification concern. Further, management of element classifications must allow for recursive resolution of descendant classifications and their mappings when used in a policy or discovery context. For example, one branch of a privacy classification hierarchy system may look like the following series of classifications:

Privacy→GDPR→Personal Data→National Identifier

The classification at each level of the branch must not only independently (and optionally) support its own mapping in terms of element definitions that define that classification directly, but also roll up the hierarchical nature of the branch such that a parent classification also inherits all the definitions and mappings that are associated with its descendant classifications, allowing for resources to be effectively identified and managed at all levels of classifications.

Figure 6:
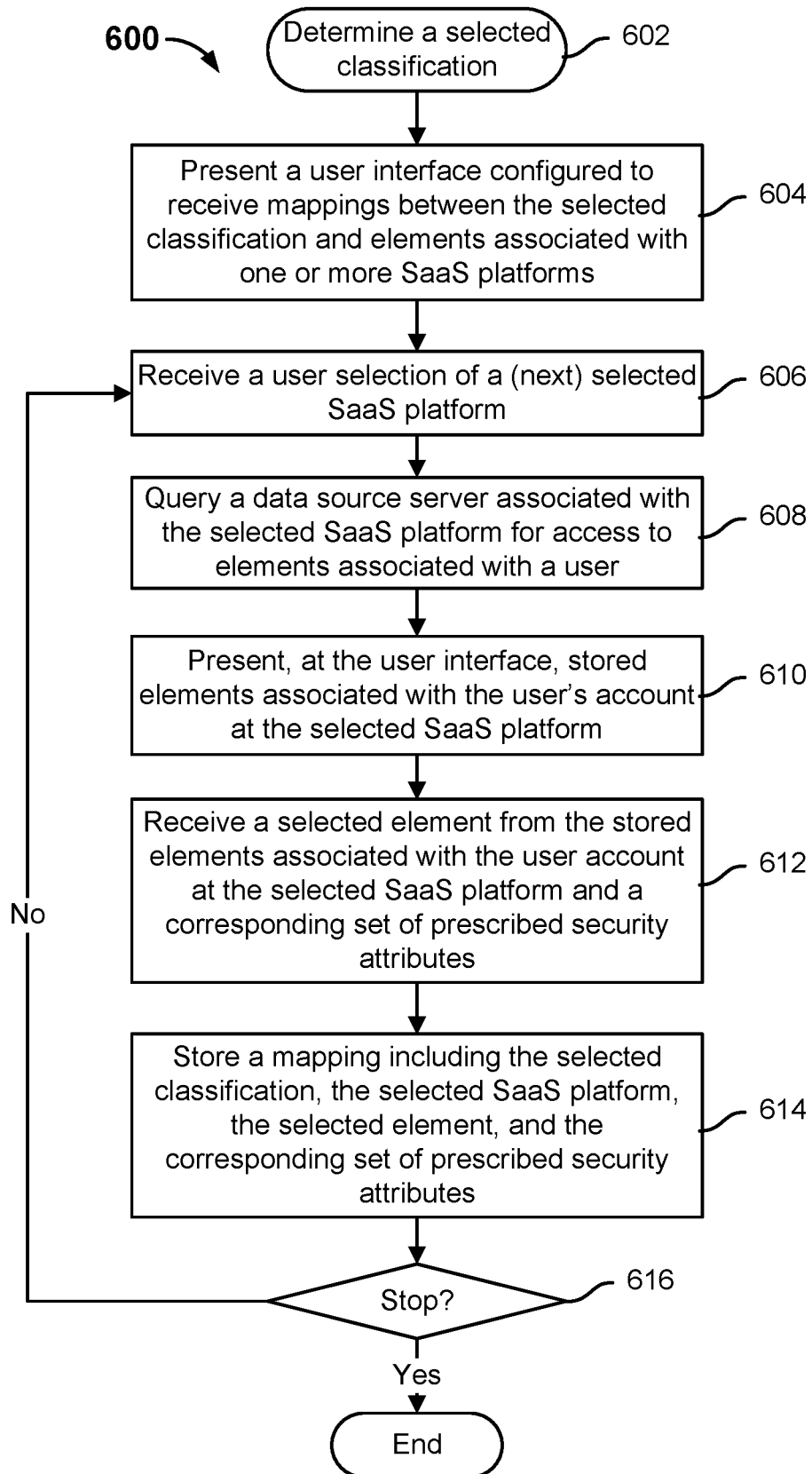
FIG. 6 is a flow diagram showing an example of a process for configuring a mapping for a selected classification.

FIG. 6 is a flow diagram showing an example of a process for configuring a mapping for a selected classification. In some embodiments, process 600 is implemented by classification management server 108 of system 100 of FIG. 1. In some embodiments, process 500 of FIG. 5 may be implemented using process 600.

At 602, a selected classification is determined. For example, the classification is selected by a user of the classification management server.

At 604, a user interface configured to obtain mappings between the selected classification and elements associated with one or more SaaS platforms is presented. Elements associated with the one or more SaaS platforms may be stored at, processed by, or otherwise made available by the platforms.

At 606, a selection of a (next) selected SaaS platform is received. For example, the SaaS platform is selected by the user of the classification management server.

At 608, a data source server associated with the selected SaaS platform is queried for access to elements associated with a user. The server is queried for access to stored, processed, or proxied elements associated with the user. The user of the classification management server had (previously) given the classification management server the user's identity, access, or credentials to access the user's account at the selected SaaS platform.

At 610, stored elements associated with the user's account at the selected SaaS platform is presented at the user interface. Using the user's identity, access, or credentials to access the user's account at the selected SaaS platform, the classification management server is configured to view the user's elements that are stored at the SaaS platform and also present, at the user interface, representations of the user's elements that are stored at the SaaS platform. For example, the classification management server is configured to present a browser window that shows one or more directories of the user's elements that is stored at, processed by, or made available through the selected SaaS platform.

In some embodiments, the metadata of elements with the user's account at the selected SaaS platform are read by the classification management server and the classification management server is configured to recommend a classification within the hierarchy of classifications based on inferring from the read metadata. An example process of such inference is described in FIG. 7, below.

At 612, a selected element from the stored elements associated with the user account at the selected SaaS platform and a corresponding set of prescribed security attributes are received. An element from the presented representation of the user's elements that are stored at the SaaS platform is selected by the user at the user interface that is presented by the classification management server. Furthermore, a set of prescribed security attributes (e.g., permitted access types) corresponding to the selected element is also selected by the user at the user interface that is presented by the classification management server.

At 614, a mapping including the selected classification, the selected SaaS platform, the selected element, and the corresponding set of prescribed security attributes is stored.

At 616, it is determined whether there is at least one more SaaS platform for which a mapping is to be configured. In the event that there is at least one more SaaS platform for which mappings are to be configured, control is returned to step 606. Otherwise, in the event that there are no more SaaS platforms for which mappings are to be configured, process 600 ends. As mentioned above, each classification within a set of classifications can be mapped to a classification management server's user's elements associated with one or more SaaS platforms. As such, steps 606 through 616 can be repeated for each different SaaS platform for which mappings are to be configured and stored for each selected classification.

Figure 7:
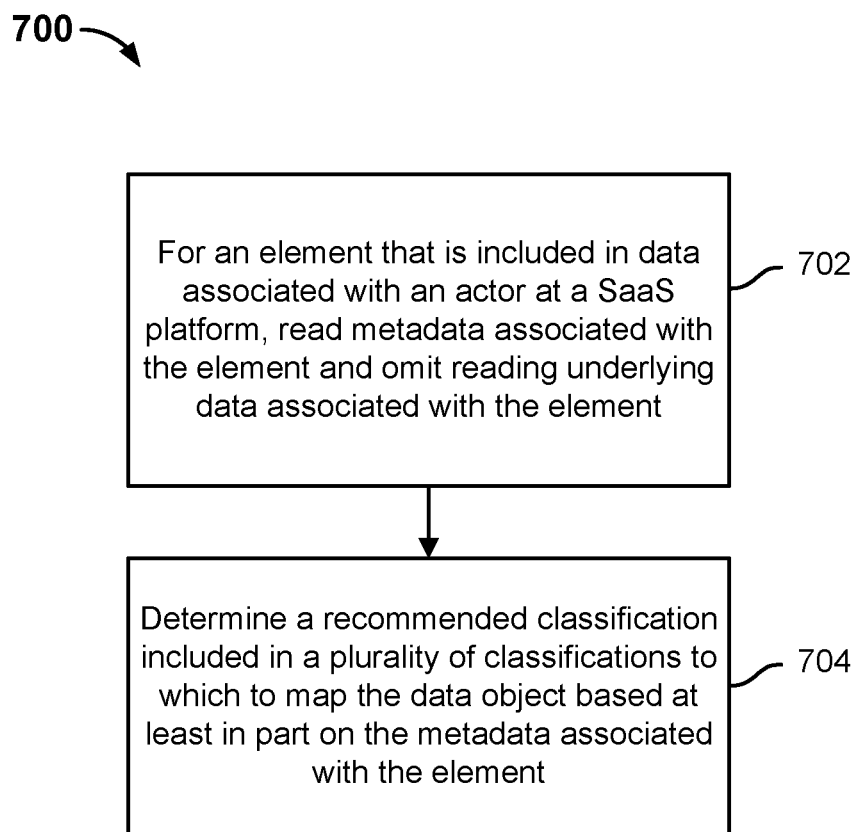
FIG. 7 is a flow diagram showing an example of a process for inferring a recommended classification for an element based on metadata of the element.

FIG. 7 is a flow diagram showing an example of a process for inferring a recommended classification for an element based on metadata of the element. In some embodiments, process 700 is implemented by classification management server 108 of system 100 of FIG. 1.

At 702, for an element that is included in data associated with an actor at a SaaS platform, metadata associated with the element is read and reading underlying data associated with the element from the stored data is omitted. The data may be stored, processed, or otherwise made available by the SaaS platform. The underlying data also includes the content or substance of data associated with the element.

At 704, a recommended classification included in a plurality of classifications to which to map the element is determined based at least in part on the metadata associated with the element.

Classification of elements is crucial for security automation to be able to evaluate data access policies about sets of actors and their entitlements (e.g., instances of grants of permissions) to classes of elements. Traditionally, classifying unstructured data (e.g., documents, images, presentations, etc.) has been a difficult task due to attempts to solve it by "teaching" computers to "understand" the file/data and make classification decisions based on its contents. This is both resource and time intensive. In order to operate much faster and with less technical complexity, as well as to alleviate the need for the system to have read access to the contents of the data, in some embodiments, the classification management server is capable of making reasonably accurate classification decisions based solely on the name, location, and metadata of the element to be classified.

In some embodiments, the classification management server reads a SaaS platform element's metadata, which may include structured or unstructured data, system capabilities, resources, or other SaaS application elements, and is capable of determining a recommended classification for the element with a high degree of accuracy without inspecting the underlying content of the element. In some embodiments, a recommended classification can be generated for an element by comparing at least a portion of the element's metadata against the names or other metadata (e.g., tags) of classifications within a classification management server's (e.g., customized) hierarchy of classifications. The advantage of this inference process is that it does not require inspection of the contents of the element. The inference can be performed using one or more, but not limited to, the following types of metadata:

- The name of the configuration, compliance control, event, resource, data, or object.
- The type of the configuration, compliance control, event, resource, data, or object (e.g., a slide deck file type, a database record).
- The location and/or path of the configuration, compliance control, event, resource, data, or object.
- The configuration, compliance control, event, resource, data, or object's creation information (e.g., owner, name, extension, author, creation date, modification date, record type).
- Information around the nature of the observed access to the configuration, compliance control, event, resource, which may be combined with organization information to infer additional context providing an application. For example, configuration, compliance control, event, resource, data, or object historically or currently accessed or leveraged by users in a particular company organization may cause an inference about the configuration, compliance control, event, resource, data, or object to be classified as being related to that organization. Another example could be configuration, compliance control, event, resource, data, or object accessed by a different cloud system serving a given role (e.g., a finance role) could cause the configuration, compliance control, event, resource, data, or object to be classified as being associated with that role.

Information around the potential access by, due to the authorization properties currently or historically associated with a configuration, compliance control, event, resource, data, or object could cause it to be classified as being related to the users, roles, groups, profiles, or other type of actor that may have been, are currently, or could be granted access to the resource, data, or object.

Information of the participation in a resource by users may cause an inference about a configuration, compliance control, event, resource, data, or object to cause it to be associated to the organization or other qualities of the participation. For example, a web-based meeting may be classified as Executive based on executives participating in the meeting or based on the Executive classification being associated with the participants of the meeting.

Information of the availability to participate in a resource by users may cause an inference about a configuration, compliance control, event, resource, data, or object to cause it to be associated to the organization or other qualities of the participation. For example, the membership list to a meeting, shared folder, virtual data room, or other resource may cause it to be classified as Executive if there exists the potential, opportunity, invitation, or other relationship with executive members or members otherwise associated with the Executive classification Information of the owner or creator of that element, to include organizational, geographical, group membership, directory location, role, communication patterns (to include implied association with additional users, people, or actors by virtue of communication or relationship with those users, people, or actors).

Associations built into the system by experts (e.g., Customer Account records may belong to a Financial Data classification or a Customer Data classification based off of Record Type metadata).

Associations consumed by the system as provided by individual users (e.g., user may provide context that a web-based meeting recording is to be automatically classified as Sensitive Data if the creator was an employee user).

Inferences based on the data/file name, type, and location (e.g., a PDF file located in a folder called "Tax Documents" is classified as Financial Data without consumption of the file contents).

Associations learned by the system based on corrections made by a user.

Associations imported from an external data classification library or system.

In some embodiments, using heuristics such as the example described above, elements can be classified without the need to consume the element contents, providing increased security and the ability for the system to operate at a lower privilege level. In some embodiments, users are able to view the recommended classifications of elements along with information about what inferences were made to select that classification. In some embodiments, individual users can later modify the recommended classifications of elements, which the system interprets to better classify similar elements in the future. In some embodiments, multiple assertions about recommended classifications may be generated for elements, which may be associated with a priority or confidence level. Those assertions can be further validated by another process, which may be automated or manual.

Figure 8:
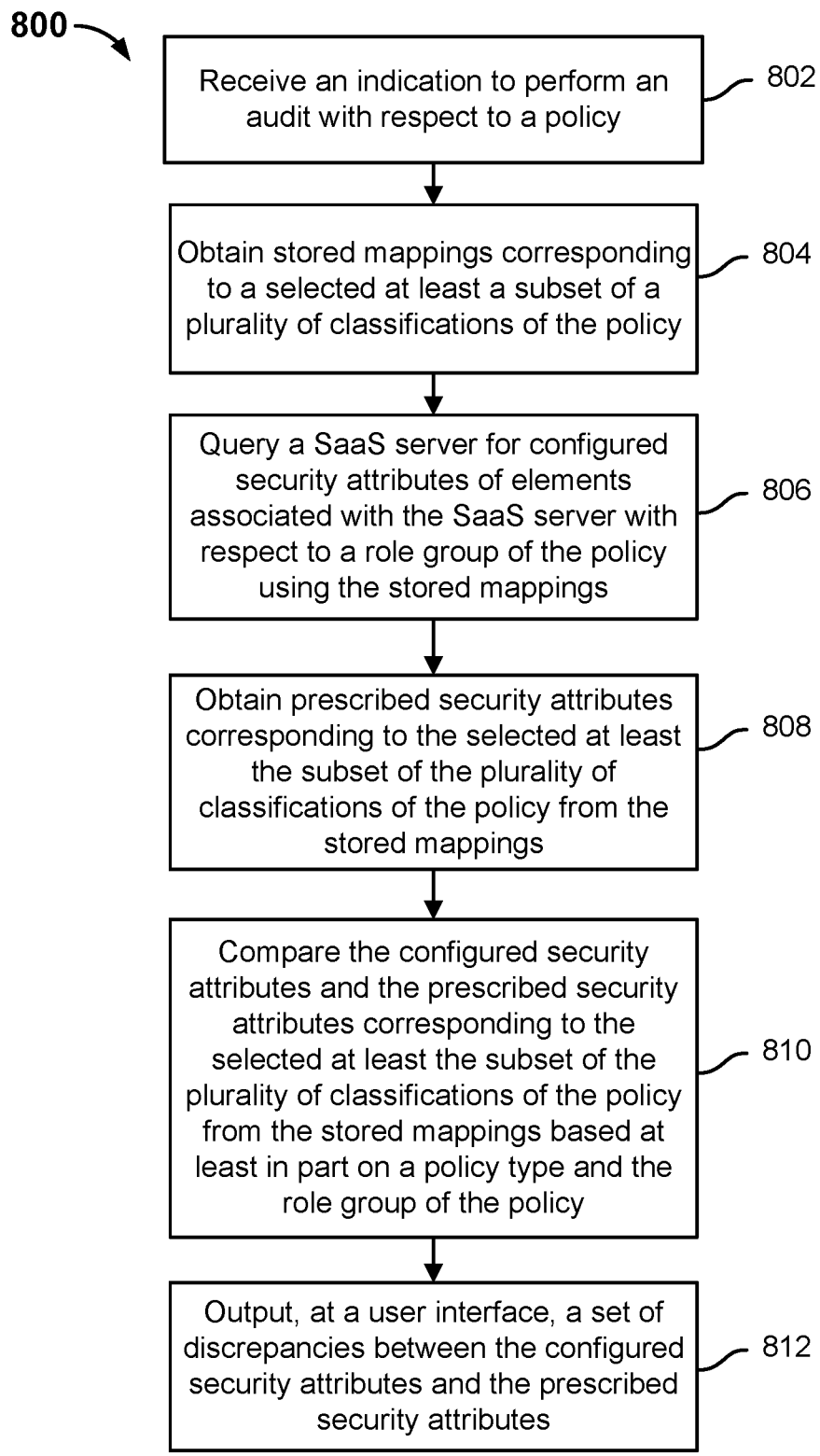
FIG. 8 is a flow diagram showing an example of a process for performing an audit with respect to a policy.

FIG. 8 is a flow diagram showing an example of a process for performing an audit with respect to a policy. In some embodiments, process 800 is implemented by classification management server 108 of system 100 of FIG. 1.

At 802, an indication to perform an audit with respect to a policy is received. In some embodiments, a policy is defined by a user of the classification management server. In some embodiments, a policy includes a policy type (e.g., a whitelist policy, a blacklist policy, or a functional policy), a selected one or more classifications from the user's customized set of classifications, and a specified role group with respect to a particular SaaS platform.

At 804, stored mappings corresponding to a selected at least subset of a plurality of classifications of the policy are obtained.

At 806, a SaaS server is queried for configured security attributes of elements associated with the SaaS server with respect to a role group of the policy using the stored mappings. The role group that is associated with the policy comprises attributes that describe a set of actors with respect to the classification management server user's (e.g., an administrative user at an enterprise) elements that are stored at a particular SaaS platform. For example, the role group may describe members of the public, employees at the enterprise, accountants at the enterprise, executives at the enterprise, software engineers at the enterprise, contractors of the enterprise, servers, systems, processes, machine images, integrations, applications, network connections, and/or virtual users and systems. The configured security attributes include the actually configured security attributes of the actors of the role group with respect to the elements at the SaaS platform that are included in the mappings that are stored for the classifications that are included in the policy.

At 808, prescribed security attributes corresponding to the selected at least the subset of the plurality of classifications of the policy is obtained from the stored mappings.

At 810, the configured security attributes are compared to the prescribed security attributes corresponding to the selected at least the subset of the plurality of classifications of the policy from the stored mappings based at least in part on a policy type and the role group of the policy.

At 812, a set of discrepancies between the configured security attributes and the prescribed security attributes is output at a user interface. The existence of a discrepancy indicates that an intended/desired security attribute is not actually configured at the SaaS platform, which means that a security risk is present at the SaaS platform. A security risk may be associated with sensitive elements being exposed (e.g., accessible), misconfigured, unmonitored, or alerted upon by or related to actors that should not be able to access such data, data that should be exposed to certain users but those users do not have the desired access to such data, configurations not in compliance with recommendations or benchmarks, or actual events observed in a system. In some embodiments, each discrepancy may be displayed with corresponding information at a user interface to inform the classification management server's user of its potential security risk. In some embodiments, suggestions for how each discrepancy can be manually eliminated (e.g., by changing certain configurations at the SaaS platform) may also be presented at the user interface. In other embodiments, the system may directly or indirectly (e.g., through integrations, workflow, etc.) cause the discrepancy to be eliminated.

In the specific example, a policy of the whitelist type of policy includes a role group that describes executives at Enterprise Acme and a selected classification that pertains to "Financials." The mappings that are stored for the "Financials" classification map to files, stored by Customer Relationship Management SaaS Platform Beta, that include details of Enterprise Acme's revenue from the last fiscal year. To perform an audit on the policy, the classification management server is configured to query the data source server corresponding to the Customer Relationship Management SaaS Platform Beta's server for the actually configured security attributes (e.g., access types such as a permission to read and/or a permission to edit) of executives at Enterprise A with respect to the files that map to the "Financials" classification. The mappings that are stored for the "Financials" classification also include the prescribed (e.g., intended/desired) security attributes corresponding to the Customer Relationship Management SaaS Platform Beta files. The configured security attributes of the Enterprise A executives with respect to the Customer Relationship Management SaaS Platform Beta files that map to the "Financials" classification are compared to the prescribed (e.g., intended/desired) security attributes that are included in the Customer Relationship Management SaaS Platform Beta mappings of the "Financials" classification. Because the policy is a whitelist policy, which describes allowed accesses, the configured security attributes are intended to match the prescribed (e.g., intended/desired) security attributes. In this example, if the configured security attributes did match the prescribed security attributes, then the Enterprise A executives have the desired types of access (e.g., the ability to read and edit) to the files at Customer Relationship Management SaaS Platform Beta. However, if the configured security attributes did not (e.g., exactly) match the prescribed security attributes, then at least one discrepancy exists. Specifically, the existence of at least a discrepancy in this example means that at least some of the Enterprise A executives lack the desired types of access (e.g., the ability to read and edit) to the files at Customer Relationship Management SaaS Platform Beta. Information related to this discrepancy, which may be indicative of a security risk, is presented at the user interface.

Figure 9:
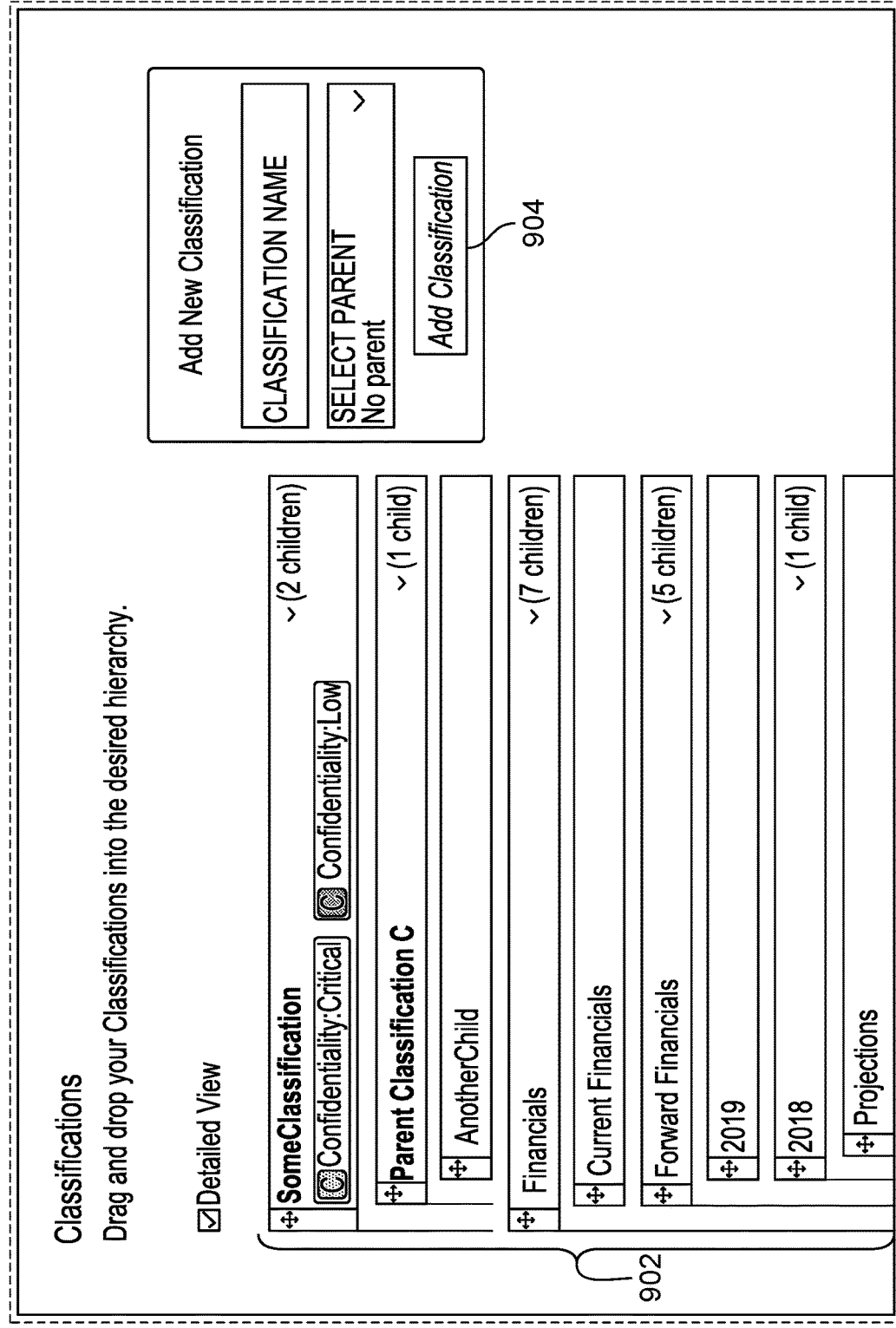
FIG. 9 is a diagram showing an example user interface for configuring a customized set of classifications.

FIG. 9 is a diagram showing an example user interface for configuring a customized set of classifications. In some embodiments, user interface 900 is presented by a classification management server. Set 902 shows a set of default classifications with their default parent-child relationships (e.g., hierarchical levels). A user can interface with the classifications shown in set 902 to rearrange their respective parent-child relationships (e.g., hierarchical levels). A user can also select on a particular classification of set 902 to edit that classification, including to, delete that classification or rename that classification, for example. To add a new classification to set 902, the user can select "Add Classification" button 904.

FIG. 10 is a diagram showing an example user interface for configuring a new classification, "New Classification A." In some embodiments, user interface 1000 is presented by a classification management server in response to a user selection to add Parent Classification C within set 902 as a parent classification and then the user selection of Add Classification button 904 of user interface 900 of FIG. 9. As such, "New Classification A" will be added under "Parent Classification C" within set 902 as shown in FIG. 9. User interface 1000 presents Add SaaS B Mapping button 1002 to add a new mapping of elements from SaaS Platform B to "New Classification A." User interface 1000 presents tag addition button 1004 to add a tag to "New Classification A."

FIG. 11 is a diagram showing an example user interface for configuring a new mapping for "New Classification A." In some embodiments, user interface 1100 is presented by a classification management server in response to a user selection of "Add SaaS B Mapping" button 1002 of user interface 1000 of FIG. 10. To add a specific new mapping of data from SaaS Platform B to "New Classification A," the user interface presents "Add Object" button 1102. In some embodiments, in response to a user selection of "Add Object" button 1102, a representation of the classification management server's user's elements at SaaS Platform B is presented (e.g., within the window that overlays user interface 1100) and the user can select one or more elements from the representation of the classification management server's user's elements at SaaS Platform B to include in the particular mapping. After the element(s) are selected from SaaS Platform B, the user can select an edit button similar to edit button 1104 to select the prescribed security attributes for those selected SaaS B elements within the mapping. As shown in user interface 1100, the prescribed security attributes may include the abilities to create, read, edit, delete, share, list, upload, download, connect, login attempt, data access attempt, data modification attempt, API call, integration linkage, monitoring process, business process, administrative permission usage, view all, or modify all.

Figure 12A:
FIGS. 12A and 12B are diagrams showing an example user interface for configuring one or more tags for "New Classification A."
Figure 12B:
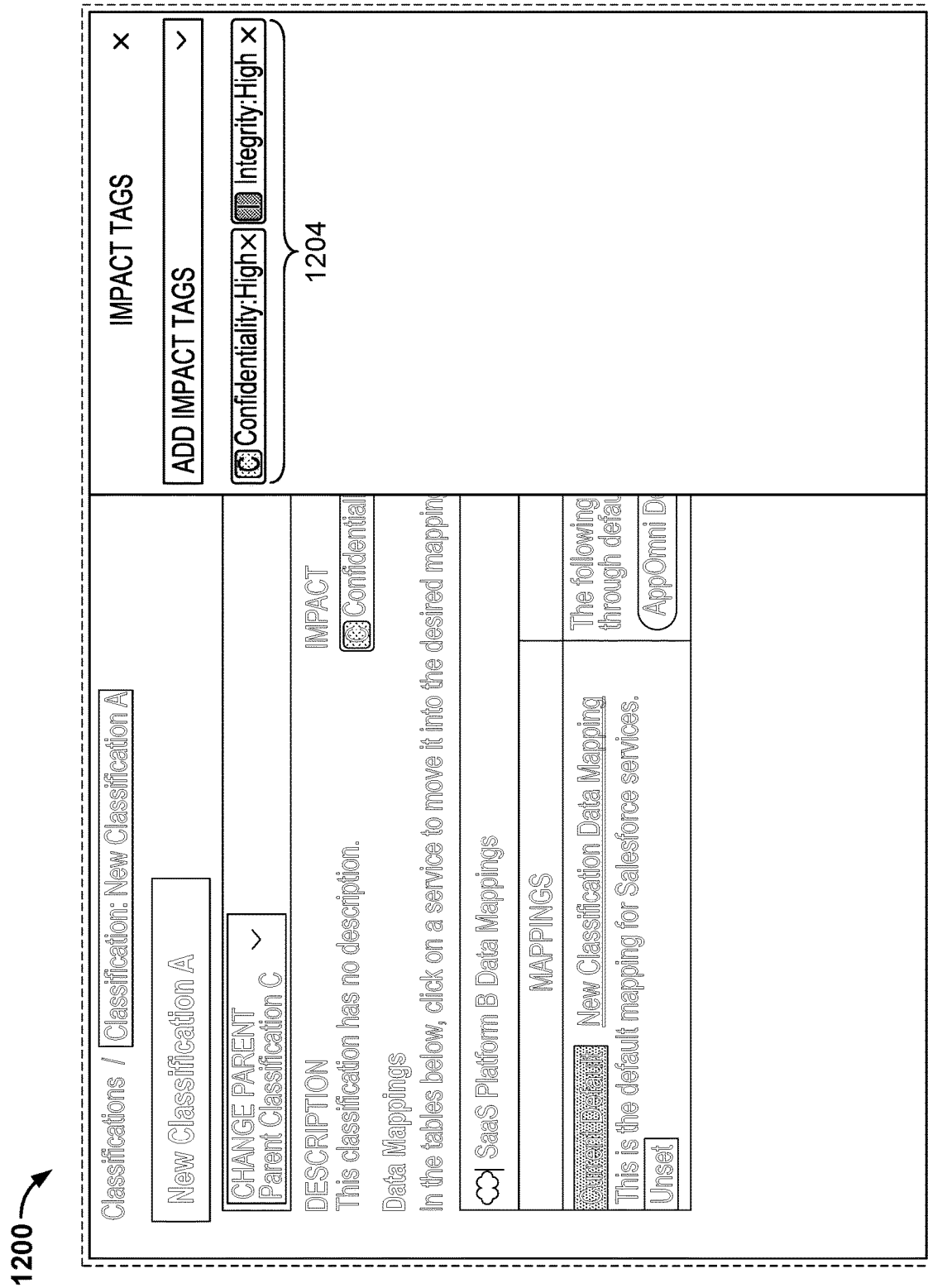

FIGS. 12A and 12B are diagrams showing an example user interface for configuring one or more tags for "New Classification A." In some embodiments, user interface 1200 is presented by a classification management server in response to a user selection to select add tag button 1004 of user interface 1000 of FIG. 10. To add a new tag ("Impact Tags") to "New Classification A," as shown in FIG. 12A, user interface 1200 interacts with tag dropdown menu 1202 to select one or more predetermined tags within tag dropdown menu 1202 to associate with "New Classification A." FIG. 12B shows selected tags 1204 to be associated with "New Classification A." Selected tags 1204 include "Confidentiality: High" and "Integrity: High," which describe the nature/characteristic of the SaaS platform elements that have been mapped to "New Classification A."

Figure 13:
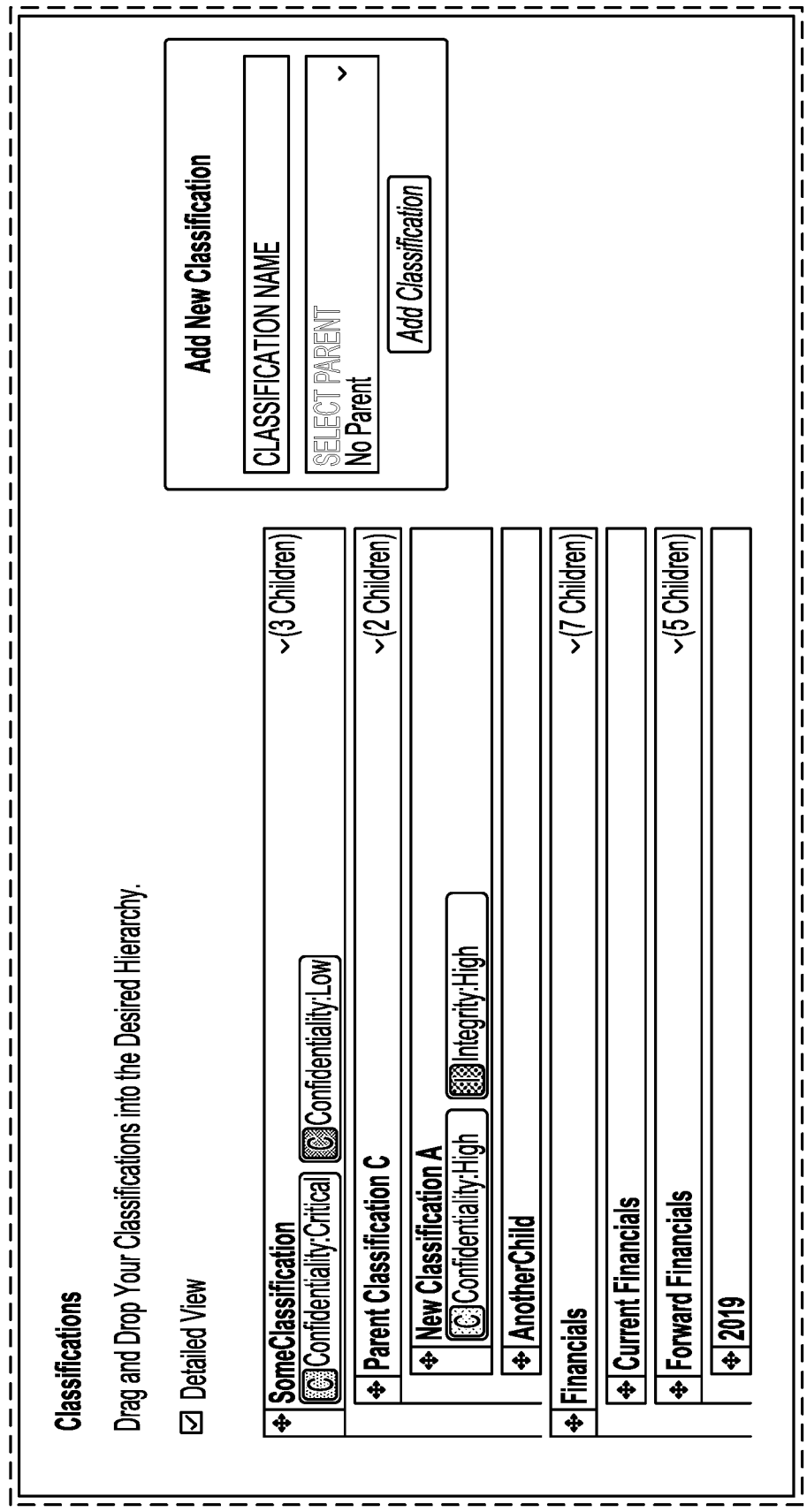
FIG. 13 is a diagram showing an example user interface for presenting a customized set of classifications.

FIG. 13 is a diagram showing an example user interface for presenting a customized set of classifications. In some embodiments, user interface 1300 presents an updated customized set of classifications that includes "New Classification A" and its corresponding tags that were configured as described above.

Figure 14:
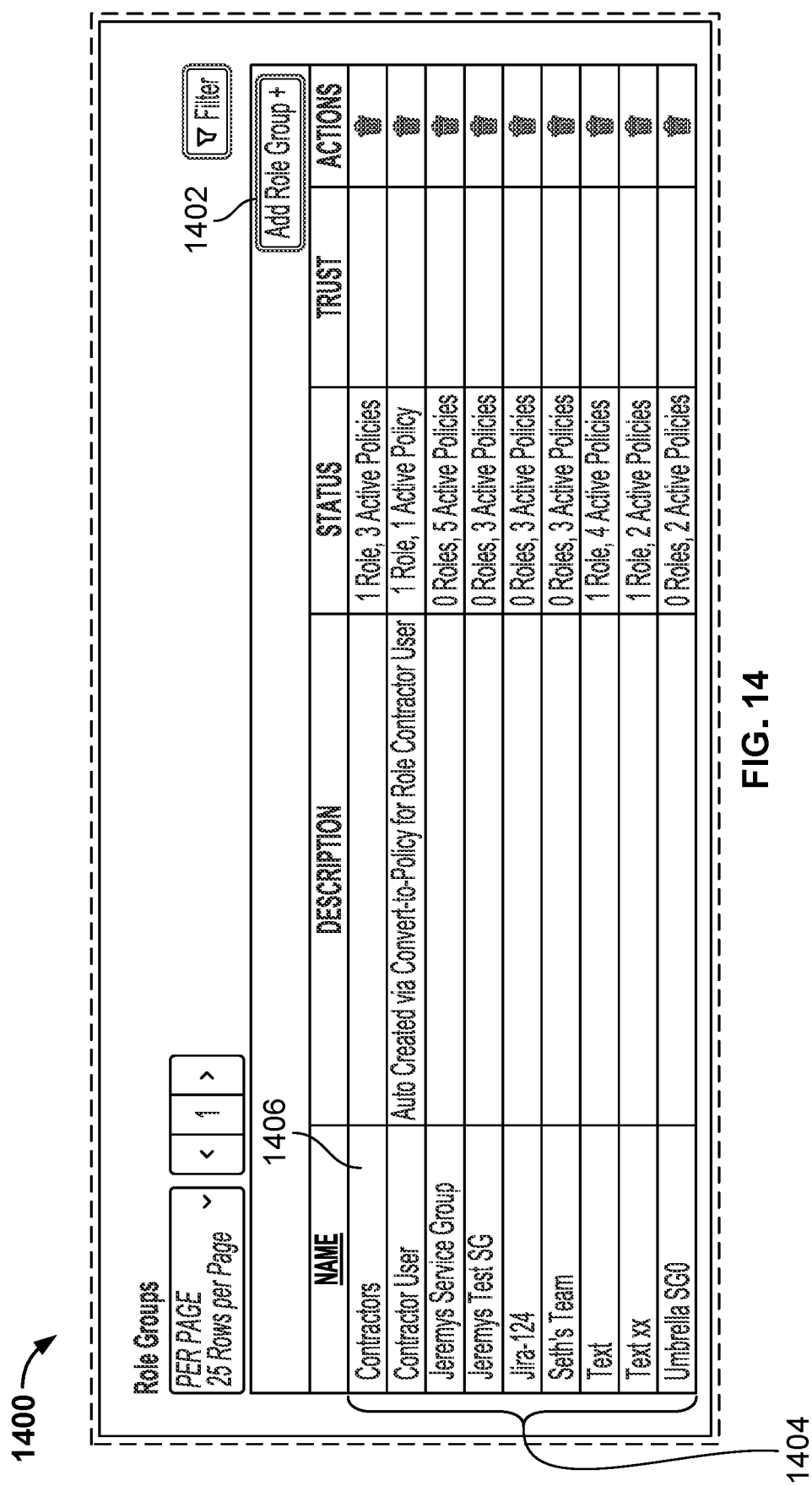
FIG. 14 is a diagram showing an example user interface for presenting a set of configured role groups.

FIG. 14 is a diagram showing an example user interface for presenting a set of configured role groups. In some embodiments, user interface 1400 is presented in response to a user selection to view the role groups that have been configured. Each row of list 1404 shows information pertaining to a corresponding configured role group. A role group corresponding to any row of list 1404 can be edited if the user selects the corresponding row. To add a new role group to list 1404, the user can select "Add Role Group" button 1402.

Figure 15A:
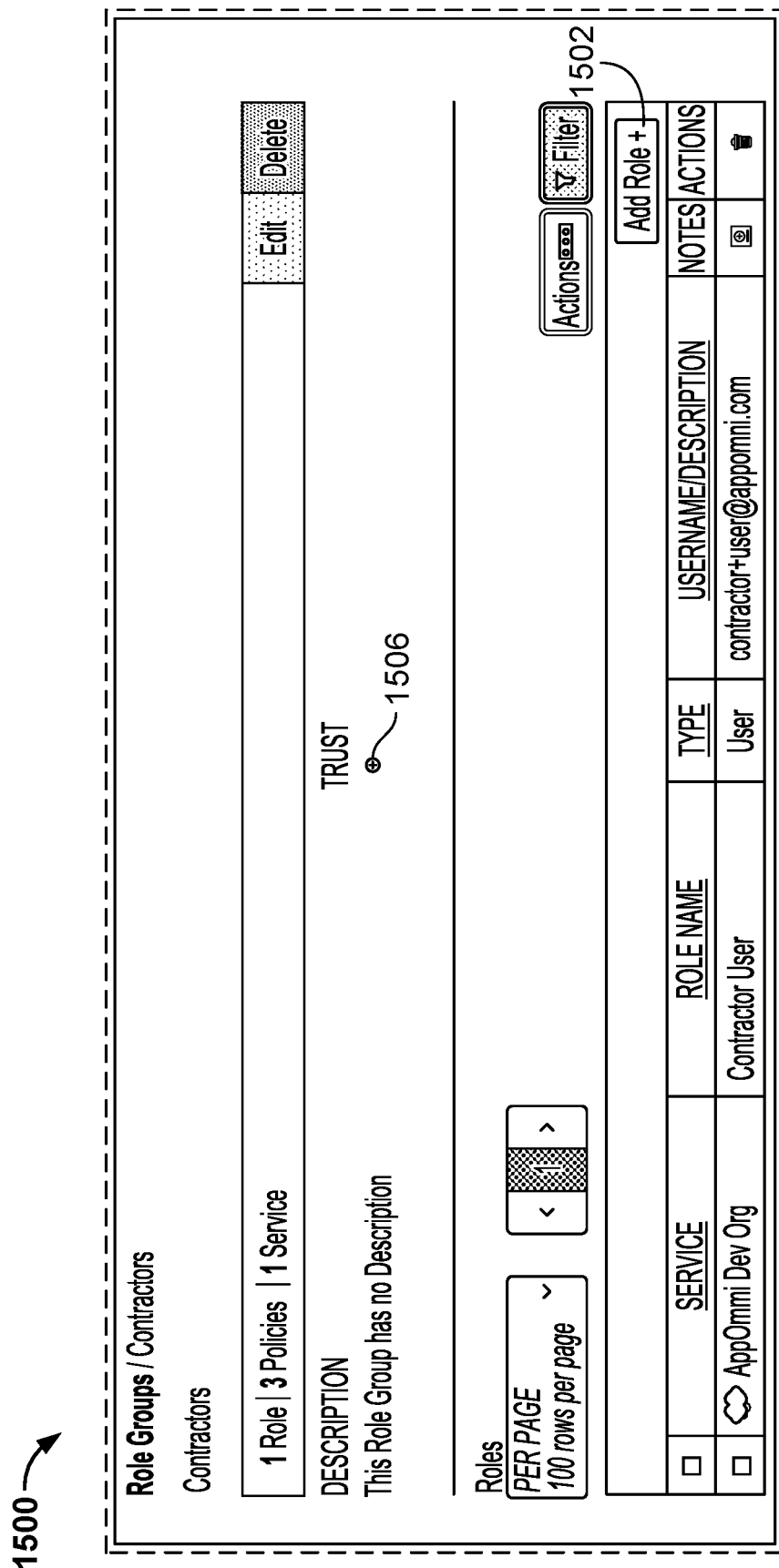
FIGS. 15A, 15B, 15C, and 15D are diagrams showing an example user interface for updating the configuration of selected role group, "Contractors."
Figure 15B:
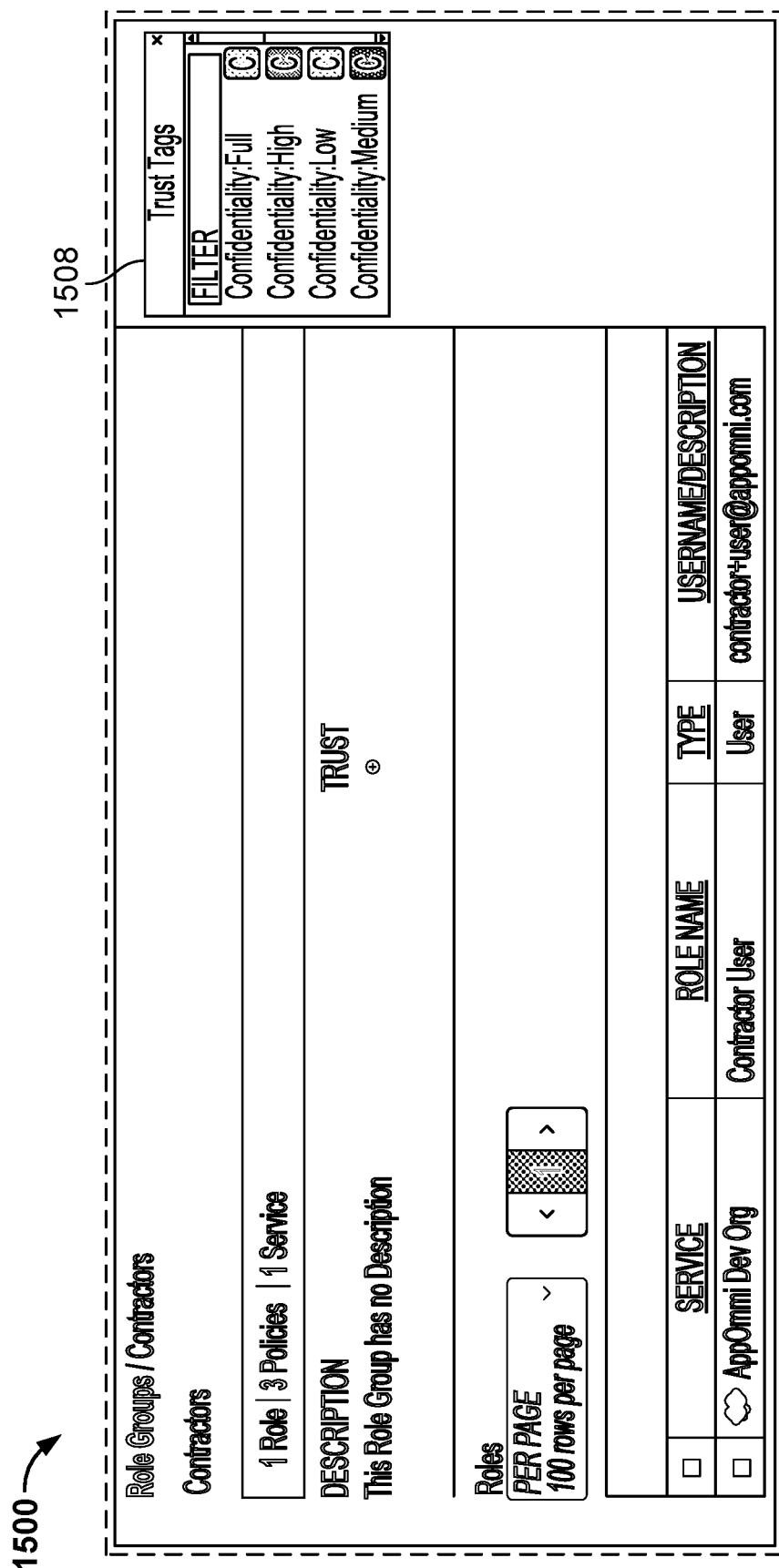
Figure 15C:
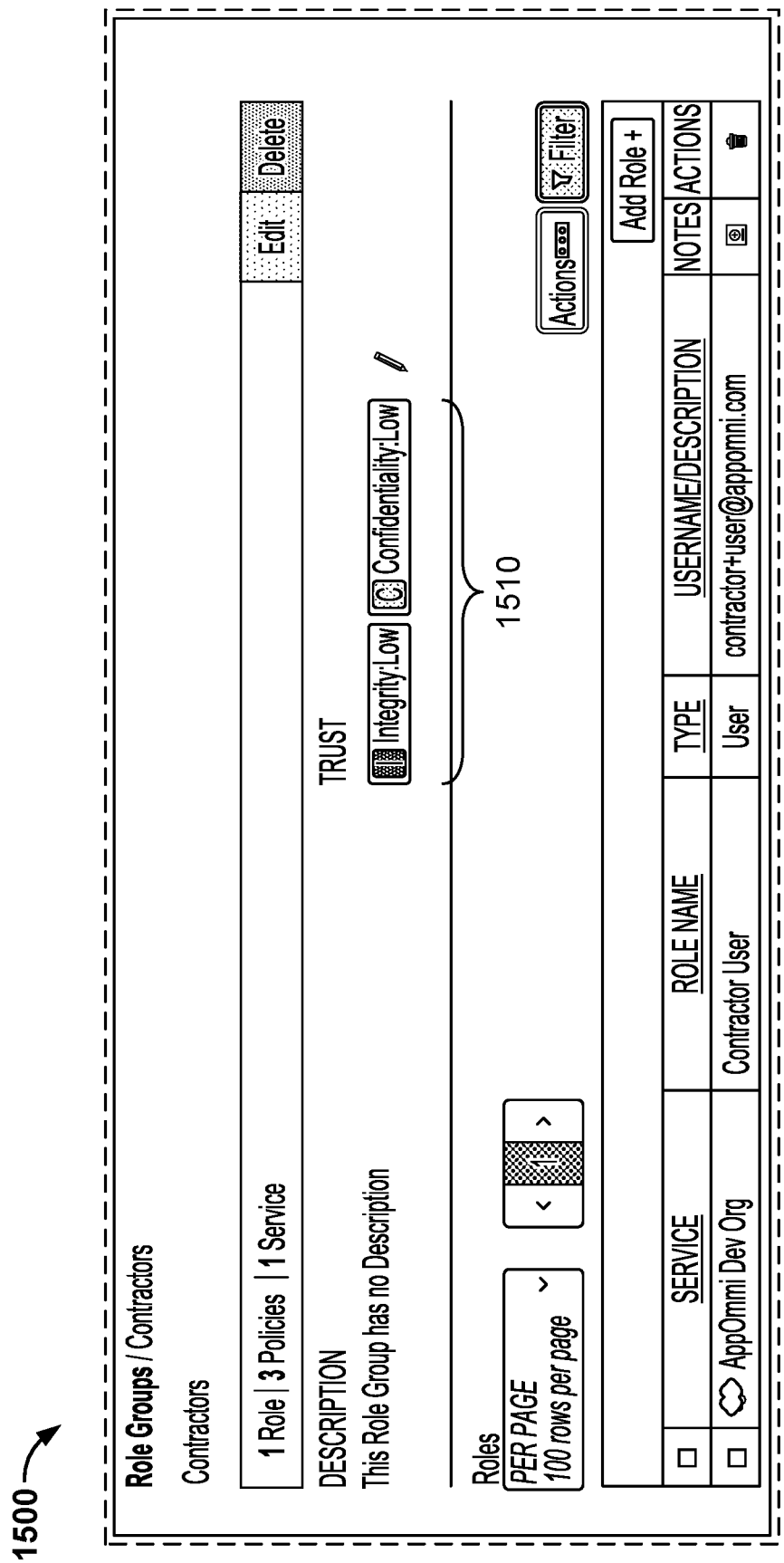
Figure 15D:
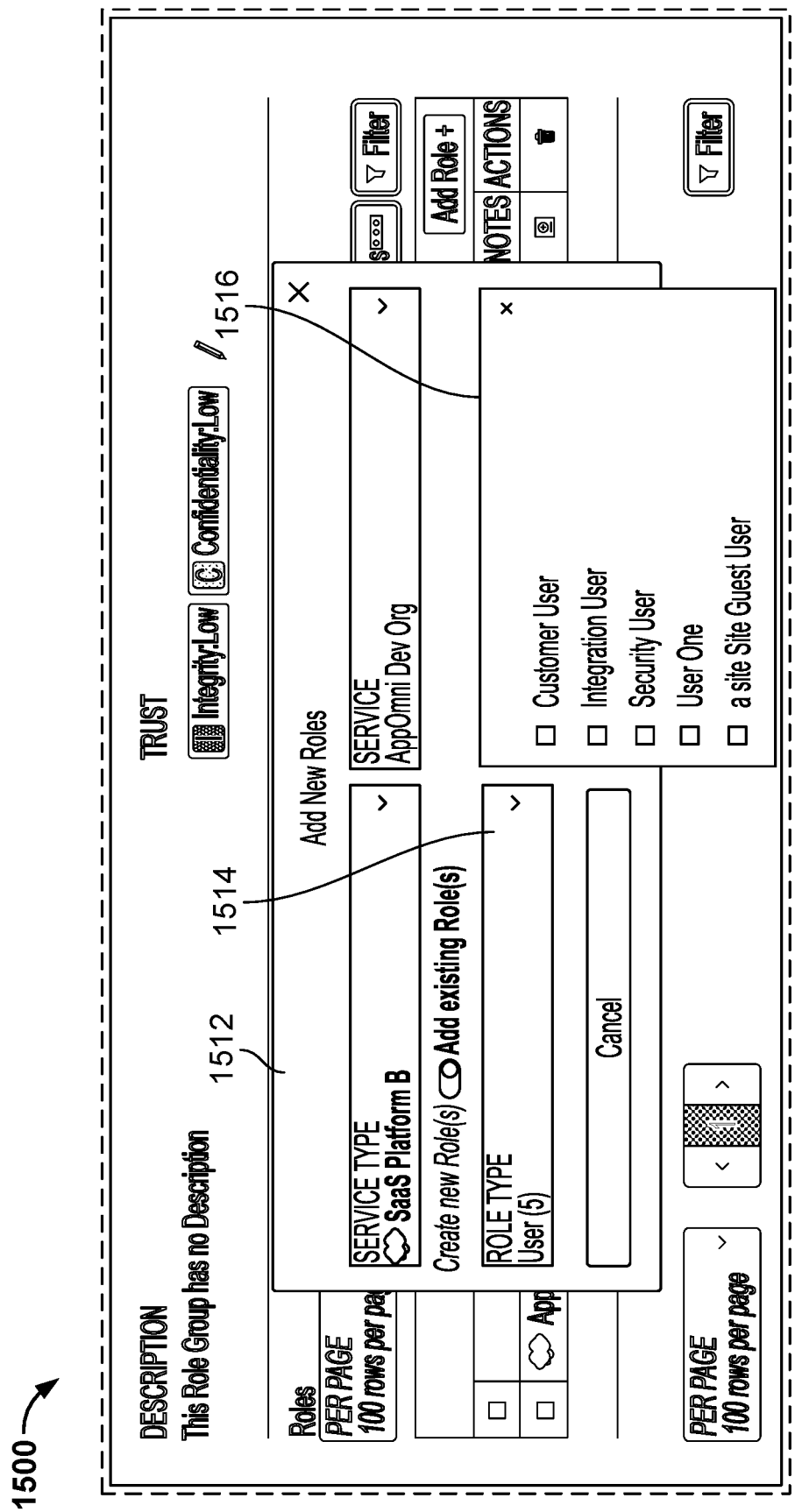

FIGS. 15A, 15B, 15C, and 15D are diagrams showing an example user interface for updating the configuration of selected role group, "Contractors." In some embodiments, user interface 1500 is presented by the classification management server in response to a user selection of row 1406 associated with the role group "Contractors" of user interface 1400 of FIG. 14. As shown in user interface 1500 in FIG. 15A, the "Contractors" role group currently includes one role of contractor users with respect to the service (e.g., the SaaS Platform) of "AppOmni Dev Org" at SaaS Platform B. The attribute(s) that describe contractor users of this role include users with email addresses that match the format/ regular expression of "contractor+user(.*?)@appomni-.com." To add a new tag to the "Contractors" role group, the user can select add tag button 1506. FIG. 15B shows tag dropdown menu 1508 with a list of tags ("Trust Tags") that can be associated with the "Contractors" role group. FIG. 15C shows selected tags 1510 to be associated with the "Contractors" role group. Selected tags 1510 include "Integrity: Low" and "Confidentiality: Low," which describe the respective degrees of trust that the user of the classification management server has in the set of actors that are associated with this role group. In this specific example, because contractors are temporary workers over which the user of the classification management server may have less control, the role group to which they are included ("Contractors") is associated with low integrity and the degree of confidentiality of data they may be exposed to is low. FIG. 15D shows a menu to add a new role to the "Contractors" role group. In some embodiments, menu 1512 may be presented over user interface 1500 in response to a user selection of "Add Role" button 1502. Menu 1512 includes the selected "Service Type" (e.g., SaaS platform name) of "SaaS Platform B" and the "service" (e.g., the classification management server user's account at "SaaS Platform B") of "AppOmni Dev Org." Menu 1512 further shows "Role Type" dropdown menu 1514 and "Role" dropdown menu 1516 for selecting new roles with respect to AppOmni Dev Org's user account at SaaS Platform B to add to the "Contractors" role group.

FIG. 16 is a diagram showing an example user interface for presenting a set of configured policies. In some embodiments, user interface 1600 is presented in response to a user selection to view the policies that have been configured. Each row of list 1604 shows information pertaining to a corresponding configured policy. A policy corresponding to any row of list 1604 can be edited if the user selects the corresponding row. To add a new role group to list 1604, the user can select "Add Policy" button 1602.

Figure 17:
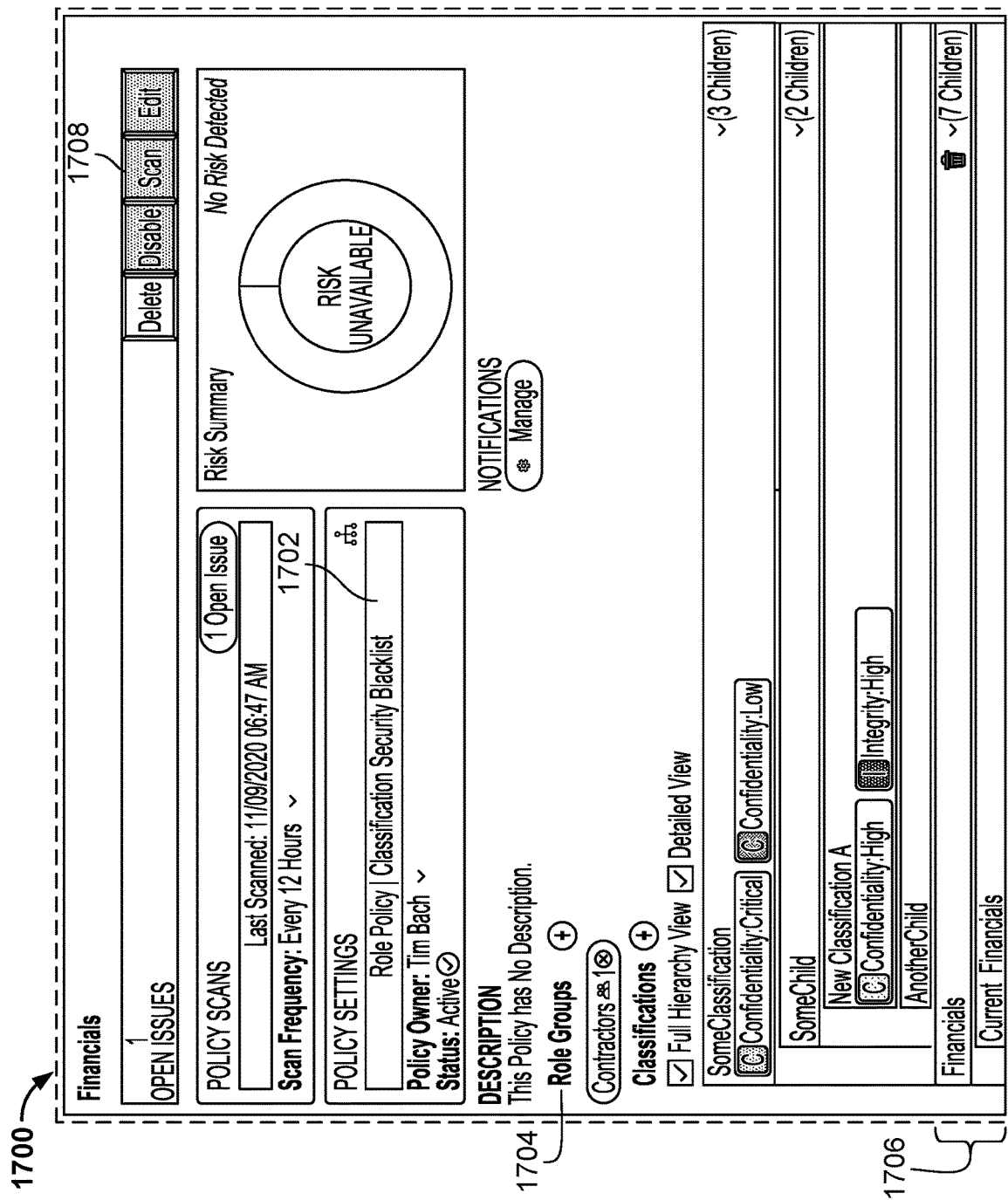
FIG. 17 is a diagram showing an example user interface for updating the configuration of a selected policy named "Financials."

FIG. 17 is a diagram showing an example user interface for updating the configuration of a selected policy named "Financials." In some embodiments, user interface 1700 is presented by the classification management server in response to a user selection of row 1606 associated with the policy named "Financials" of user interface 1600 of FIG. 16. User interface 1700 shows that the current configuration of the policy named "Financials" includes policy type 1702 of "blacklist," selected role group 1704 of "Contractors," and selected classifications 1706 comprising parent classification "Financials" and its child classification "Current Financials." For example, selected role group 1704 of "Contractors" is the same role group for which configuration information was shown in FIGS. 15A, 15B, 15C, and 15D, described above. Given that the policy of "Financials" is a "blacklist" type of policy, an audit performed with respect to the policy can help to monitor whether actors that are described by the "Contractors" role group have actually configured security attributes at the SaaS platforms in the mapping of the "Financials" classification branch that do not match the prescribed security attributes of those same mappings. However, given that this is a blacklist policy, if the configured security attributes match any of the prescribed security attributes, then a discrepancy is determined. To perform such an audit with respect to the "Financials" policy, the user can select "Scan" button 1708.

Figure 18:
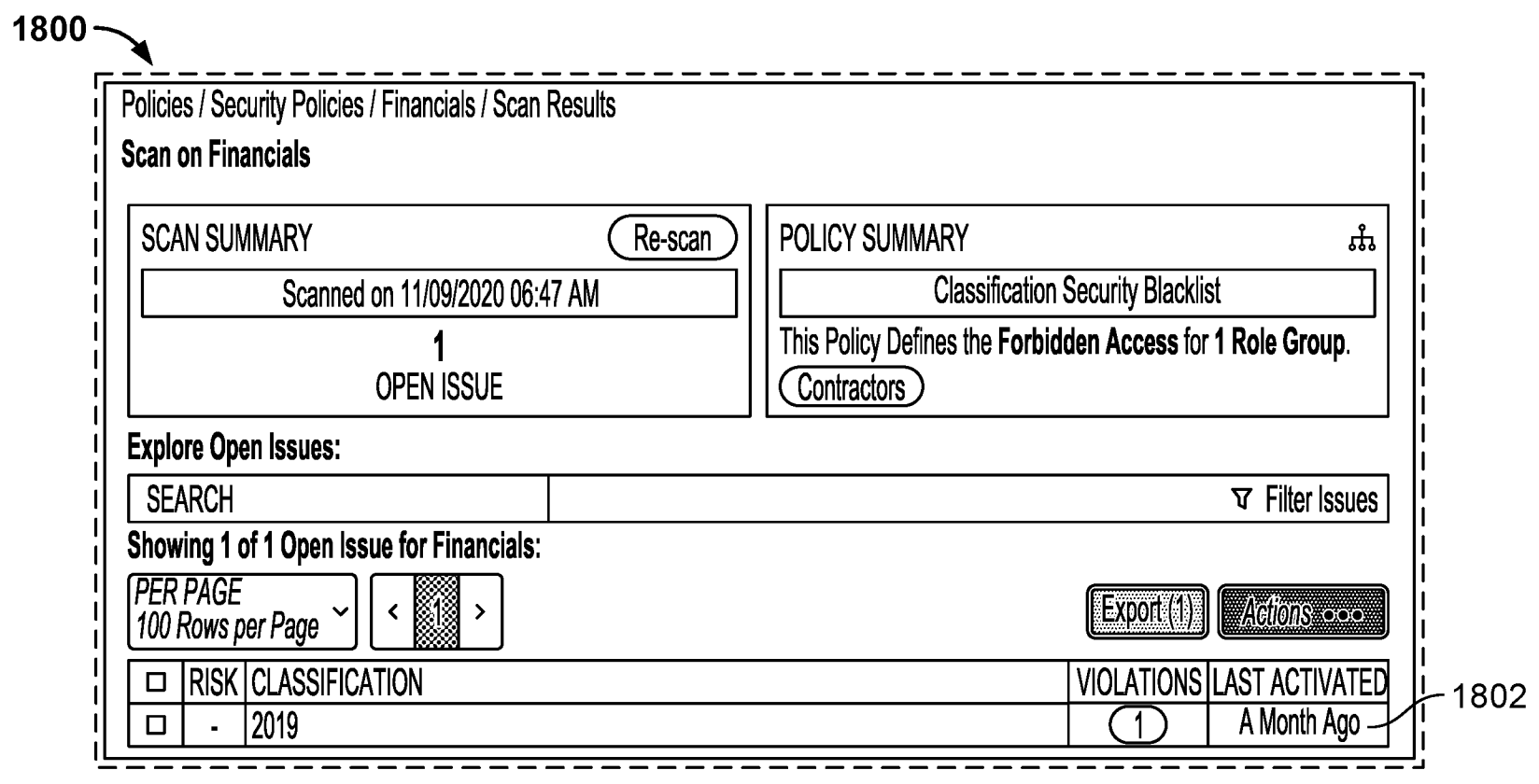

FIG. 18 is a diagram showing an example user interface for presenting the results of an audit performed on the "Financials" policy. In some embodiments, user interface 1800 presenting audit results is presented by the classification management server in response to a user selection of "Scan" button 1708 associated with the policy named "Financials" of user interface 1700 of FIG. 17. The audit performed on the "Financials" policy resulted in one or more discrepancies determined between the configured security attributes and the prescribed security attributes. As such, user interface 1800 presents information regarding one open issue that corresponds to the one or more discrepancies that were determined during the audit ("scan"). Information pertaining to this issue, including the classification in which the discrepancies occurred, is presented in row 1802. More information pertaining to the issue, including, for example, recommended steps for eliminating or remedying the issue, may be presented in response to a user selection of row 1802.

A first example use case of the classification management system is to facilitate access attestations in an organization (e.g., enterprise). "Access attestation" is the process by which managers within an organization periodically attest that the access of their subordinates to systems/data is current and appropriate. Currently, the access attestation process does not incorporate meaningful context for the managers. For example, a manager may know that JaneDoe is in role "SalesOperations" for a given system but the manager may not know what that role actually implies in terms of JaneDoe's access or abilities. However, by using classification management as described herein, a manager can leverage the mappings corresponding to a configured of classifications to easily identify the classification(s) that are relevant to a subordinate's accesses. For example, the manager could query the classification management server to determine which classifications are mapped to elements to which actor JaneDoe has access. In response to such a query, the classification management server can determine stored mappings to classifications in a set that include elements to which actor JaneDoe has access. Then, the classification management server can identify the one or more classifications with the mappings to the elements (e.g., at one or more data sources) to which actor JaneDoe has access to and then present those classifications at a user interface. Because the classifications would have been configured in a way to meaningfully and specifically reflect the organization's own business processes, surfacing for the manager the classifications with mapped to elements to which a particular actor (e.g., subordinate) has access to can enable the manager to understand the types of accesses and elements to which the actor is currently assigned, and thereby enable the manager to complete his/her access attestation for JaneDoe.

In a second example use case of the classification management system is to enable a query for elements at one or more data sources that match an input classification among, potentially, additional criteria. For example, a regulator or another actor that is auditing an organization's set of events that has occurred at one or more data sources can query the classification management server to obtain those elements (which include events that have occurred) that map to an input classification of a set of classifications that is managed by the classification management server. The classification management server can process the query by looking up the mappings stored for the input classifications and determine the elements (e.g., those that comprise occurred events) that are included in those mappings. For example, in addition to inputting a classification, an actor can be input as well, to filter only those elements that map to the input classification and that are accessible by the input actor.

In a third example use case of the classification management system is to translate security events that are provided by SaaS platforms into classification-aware event notifications. A SaaS platform may provide security events to an account at the SaaS platform. However, each security event typically includes identifying information that is specific to a particular SaaS platform and is not readily meaningful to a user (e.g., an administrative user of an organization such as an enterprise) of the classification management server. However, the classification management server can consume these security events that are generated by SaaS platforms and translate them into classification-aware notifications so that the classification management server user can easily understand how each security event relates to the set of classifications that the user had customized. For example, a security event includes a user ID and a program ID (e.g., a record ID, an ID that corresponds to the nature of the change made). The classification management server can use the user ID and the program ID of the security event to search for elements at the SaaS platform that generated the security event that match the user ID and/or the program ID. The classification management server can then determine which classifications have mappings that include those matching elements and present the classifications with the security events at a user interface. Additionally, the classification management server can also compare the actually configured security attributes for the actor associated with the user ID for the elements at the SaaS platform that match the program ID against the prescribed security attributes for the same elements within the mappings that include those elements. Any discrepancies in the comparison can be presented by the user interface as well.

Furthermore, a "bounding classification" can be enabled in any of the queries for any of the use cases or policy audits described above. A "bounding classification" may be an additional input of one or more classifications to which a classification management server user would like to limit the scope of the query or policy audit. The input bounding classification has the effect of allowing "only classifications that directly match or are descendants of the provided bounding classifications" to be considered in the scope of a policy audit or inquiry. In practice, multiple sets of classifications may exist and form different ways of mapping the same elements to classifications. For example, a first set of classifications could classify elements by business process and a second set of classification could classify at least some of the same elements by compliance (or have parallel compliance standards such as, for example, SOC2 and ISO27001). If a policy audit queries whether a classification management server user is in compliance with SOC2" based on the mappings in the SOC2 hierarchy, that user may want to ignore audit results that are not under the SOC2 classification hierarchy. As elements can carry multiple classifications from the different sets or hierarchies, providing a bounding classification to specify only the SOC2 relevant set is a way to avoid irrelevant classification hits from appearing within the presentation of discrepancies at a user interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an indication to perform an audit corresponding to a policy, wherein:
the policy includes identifying information associated with a set of actors and a specified at least portion of a plurality of classifications; and
the plurality of classifications comprises mappings between stored elements and prescribed security attributes;
perform the audit corresponding to the policy, comprising to compare a set of obtained security attributes associated with the set of actors to a portion of the prescribed security attributes corresponding to the specified at least portion of the plurality of classifications; and
output information pertaining to a set of discrepancies determined based at least in part on the comparison; and
a memory coupled to the processor and configured to provide the processor with instructions.

2. The system of claim 1, wherein the processor is further configured to:
present a set of default classifications;
receive one or more user classification customizations to the set of default classifications;
associate one or more supplemental attributes to at least one of the set of default classifications or the one or more user classification customizations comprising an added classification; and
store the plurality of classifications based at least in part on the set of default classifications modified by the one or more user classification customizations and the one or more supplemental attributes.

3. The system of claim 2, wherein the one or more user classification customizations include one or more of the following: an addition of a new classification, a deletion of an existing classification, a renaming of a classification, and a change of the classification's hierarchical level or movement of the classification to a different location within the set of default classifications or to a different set of classifications.

4. The system of claim 1, wherein the processor is further configured to perform inference on the stored elements to generate a recommended classification for the stored elements.

5. The system of claim 4, wherein the inference comprises to read metadata and to omit reading underlying data associated with the stored elements.

6. The system of claim 1, wherein the set of actors is determined based at least in part on a defined role group.

7. The system of claim 1, wherein the set of actors is associated with a software as a service (SaaS) platform and wherein the processor is further configured to query the set of obtained security attributes associated with the set of actors from a data source server associated with the SaaS platform.

8. The system of claim 1, wherein the prescribed security attributes comprise one or more of the following: an access type, a privilege level, and a permission type.

9. The system of claim 1, wherein the policy further comprises a policy type and wherein the comparison of the set of obtained security attributes associated with the set of actors to the at least portion of the prescribed security attributes corresponding to the specified at least portion of the plurality of classifications is performed based at least in part on the policy type, wherein the policy type comprises a blacklist type, a whitelist type, or a functional type.

10. The system of claim 1, wherein to output the information pertaining to the set of discrepancies determined based at least in part on the comparison comprises to present a discrepancy with a corresponding relevant classification of the plurality of classifications.

11. The system of claim 1, wherein the stored elements included in the mappings are associated with one or more SaaS platforms.

12. The system of claim 1, wherein the processor is further configured to:
- determine a risk score corresponding to a discrepancy; and
- output the risk score corresponding to the discrepancy.

13. The system of claim 12, wherein the risk score corresponding to the discrepancy is determined based on at least one of: a tag associated with a corresponding relevant classification corresponding to the discrepancy and an actor associated with the discrepancy.

14. The system of claim 1, wherein at least two classifications of the plurality of classifications are associated with a parent-child relationship.

15. A method, comprising:
- receiving an indication to perform an audit corresponding to a policy, wherein:
  - the policy includes identifying information associated with a set of actors and a specified at least portion of a plurality of classifications; and
  - the plurality of classifications comprises mappings between stored elements and prescribed security attributes;
- performing the audit corresponding to the policy, comprising to compare a set of obtained security attributes associated with the set of actors to a portion of the prescribed security attributes corresponding to the specified at least portion of the plurality of classifications; and
- outputting information pertaining to a set of discrepancies determined based at least in part on the comparison.

16. The method of claim 15, wherein outputting the information pertaining to the set of discrepancies determined based at least in part on the comparison comprises presenting a discrepancy with a corresponding relevant classification of the plurality of classifications.

17. The method of claim 15, wherein the stored elements included in the mappings are associated with one or more SaaS platforms.

18. The method of claim 15, further comprising:
- determining a risk score corresponding to a discrepancy; and
- outputting the risk score corresponding to the discrepancy.

19. The method of claim 15, wherein at least two classifications of the plurality of classifications are associated with a parent-child relationship.

20. A computer program product, the computer program product being embodied in a non-transitory computer readable storage medium and comprising computer instructions for:
- receiving an indication to perform an audit corresponding to a policy, wherein:
  - the policy includes identifying information associated with a set of actors and a specified at least portion of a plurality of classifications; and
  - the plurality of classifications comprises mappings between stored elements and prescribed security attributes;
- performing the audit corresponding to the policy, comprising to compare a set of obtained security attributes associated with the set of actors to a portion of the prescribed security attributes corresponding to the specified at least portion of the plurality of classifications; and
- outputting information pertaining to a set of discrepancies determined based at least in part on the comparison.

* * * * *